US007549503B2

(12) United States Patent
Kanayama et al.

(10) Patent No.: US 7,549,503 B2
(45) Date of Patent: Jun. 23, 2009

(54) STEERING DEVICE

(75) Inventors: Yukihiko Kanayama, Toyokawa (JP); Kenji Kato, Okazaki (JP); Isao Hasegawa, Seto (JP); Kenji Hayashi, Toyoake (JP)

(73) Assignees: Jtekt Corporation, Osaka-shi (JP); Toyota Jidosha Kabushiki Kaisha, Toyota-shi (JP)

(*) Notice: Subject to any disclaimer, the term of this patent is extended or adjusted under 35 U.S.C. 154(b) by 419 days.

(21) Appl. No.: 11/212,679

(22) Filed: Aug. 29, 2005

(65) Prior Publication Data

US 2006/0048995 A1 Mar. 9, 2006

(30) Foreign Application Priority Data

Sep. 3, 2004 (JP) ............................. 2004-257252
Sep. 6, 2004 (JP) ............................. 2004-257849

(51) Int. Cl.
*B62D 5/04* (2006.01)
(52) U.S. Cl. .................. 180/443; 180/444; 74/388 PS
(58) Field of Classification Search ................. 180/443, 180/444; 277/634; 74/388 PS
See application file for complete search history.

(56) References Cited

U.S. PATENT DOCUMENTS

| 4,267,743 A * | 5/1981 | Tanaka ..................... 74/473.22 |
| 4,826,466 A | 5/1989 | Triquet |
| 5,259,775 A * | 11/1993 | Kubota et al. ............... 439/164 |
| 5,975,609 A | 11/1999 | Campbell |
| 6,029,768 A * | 2/2000 | Kiyosawa ................... 180/444 |
| 6,056,297 A | 5/2000 | Harkrader et al. |
| 6,328,315 B1 | 12/2001 | Hebenstreit |
| 2003/0178242 A1 | 9/2003 | Yamamori et al. |
| 2003/0197360 A1* | 10/2003 | Shimizu ..................... 280/771 |
| 2004/0016591 A1* | 1/2004 | Kojo et al. .................. 180/443 |
| 2004/0016593 A1* | 1/2004 | Menjak et al. .............. 180/444 |

FOREIGN PATENT DOCUMENTS

| DE | 100 10 722 A1 | 9/2001 |
| EP | 0 968 900 A1 | 1/2000 |
| EP | 1 338 493 A1 | 8/2003 |
| EP | 1 419 952 A2 | 5/2004 |
| JP | 2004-58745 | 2/2004 |
| JP | 2004-224308 | 8/2004 |
| JP | 2005-96561 | 4/2005 |

* cited by examiner

*Primary Examiner*—Paul N Dickson
*Assistant Examiner*—Maurice Williams
(74) *Attorney, Agent, or Firm*—Oblon, Spivak, McClelland, Maier & Neustadt, P.C.

(57) ABSTRACT

In a steering device 10, the upper side portion of a rubber boot 120 is fixedly fitted on a case outer cylindrical component 41 of a cable case 39, and the lower side portion of the rubber boot 120 is fixed to a dashboard 100 of a vehicle body 14 over the entire circumference thereof. Thus, the case outer cylindrical component 41 can be secured against rotation more firmly compared with a prior art steering device wherein such a case outer cylindrical component is fixed at two portions thereon by means of a wire of a V-letter shape. Further, the problem attendant on the wire of the V-letter shape in the prior art steering device no longer arises even in the car models wherein the case outer cylindrical component 41 and the dashboard 100 are relatively far from each other. That is, it can be realized to secure the case outer cylindrical component 41 of the cable case 39 against rotation relative to the vehicle body 14 even in any car model.

10 Claims, 21 Drawing Sheets

STEERING DEVICE

This application claims priority under 35 U.S.C. 119 with respect to Japanese Applications No. 2004-257252 and No. 2004-257849 respectively filed on Sep. 3 and 6, 2004.

BACKGROUND OF THE INVENTION

1. Field of the Invention

The present invention relates to a steering device provided with an actuator at an intermediate portion of a steering shaft extending downward from a steering handle for altering the transmission ratio in rotation between upper and lower portions of the steering shaft in dependence on the traveling state.

2. Discussion of the Related Art

Generally, on the upper surface of an actuator provided in steering devices of this kind, there is provided a cable case of a double cylinder structure, wherein a case inner component composing an inner member of the cable case is fixed to the actuator, whereas a case outer component composing an outer member of the cable case is fixed to the vehicle body. A spiral cable constructed by winding a flat cable is housed inside the cable case and is fixed to the case inner component at one end thereof and to the case outer component at the other end thereof. Further, an external cable electrically connected to the spiral cable is stretched between the case outer component and the vehicle body, and the supplying of electric power is performed through the external cable and the spiral cable. Upon the manipulation of the steering handle, the winding state of the spiral cable changes between the case outer component and the case inner component, so that a load added by the manipulation of the steering handle is not applied to the external cable. Thus, the reaction force to the cable upon the manipulation of the steering handle is suppressed to improve the endurance of the cable.

FIG. 13 shows a prior art steering device. In this steering device, a clip 2 is provided at an intermediate portion of an external cable 1 to be fixed to the vehicle body (not shown). And, a case outer component 5 is secured against rotation relative to the vehicle body by extending a wire 4 of a V-letter shape from a wire hook 3 integrally formed on the clip 2 and by fixing opposite ends of the V-letter shape wire 4 to two portions on the circumferential surface of the case outer component 5.

However, according to the aforementioned prior art steering device, in car models wherein the clip 2 and the case outer component 5 can be arranged relatively close to each other, the angle made by the V-letter shape of the wire 4 is widened, so that the case outer component 5 can be secured against rotation. On the contrary, in other car modes wherein the clip 2 and the case outer component 5 are obliged to be far from each other, the wire 4 becomes long to make the angle of the V-letter shape narrow, so that it is unable to secure the case outer component 5 against rotation.

SUMMARY OF THE INVENTION

Accordingly, it is a primary object of the present invention to provide an improved steering device which is capable of firmly securing a case outer component against rotation relative to a vehicle body even in any car model.

Another object of the present invention is to provide an improved steering device capable of being assembled to a vehicle body without damaging a rubber boot covering an actuator which is provided on an intermediate portion of a steering shaft for altering the transmission ratio in rotation from a steering handle to a steering gear unit.

Briefly, in a first aspect of the present invention, there is provided a steering device, which comprises an actuator provided at an intermediate portion of a steering shaft extending downward from a steering handle to pass through a dashboard of a vehicle body for altering the transmission ratio in rotation between upper and lower portions of the steering shaft in dependence on the traveling state, a cable case of a double cylindrical structure arranged on an upper surface of the actuator, a case inner cylindrical component constituting the inside of the cable case and fixed to the actuator, and a case outer cylindrical component constituting the outside of the cable case and rotatable relative to the case inner cylindrical component. The steering device further comprises a spiral cable provided for supplying the actuator with electric power and housed inside the cable case with itself being wound, the spiral cable being fixed to the case inner cylindrical component at one end thereof and to the case outer cylindrical component at the other end thereof, and a cylindrical rubber boot covering the circumferential surface of the actuator. In the steering device, an upper side portion of the rubber boot is fixedly fitted on the case outer cylindrical component, and a lower side portion of the rubber boot is fixed to the dashboard.

With this construction in the first aspect, since the rubber boot is fixedly fitted onto the case outer cylindrical component at the upper side portion thereof and is fixed to the dashboard of the vehicle body at the lower side portion thereof, the case outer cylindrical component can be secured against rotation more firmly than that in the prior art steering device wherein two portions on a case outer cylindrical component are fixed with a wire of a V-letter shape. Further, the problem attendant on the wire of the V-letter shape in the prior art steering device no longer arises even in the car models wherein the case outer cylindrical component and the dashboard are relatively far from each other. That is, according to the present invention, it can be realized to firmly secure the case outer cylindrical component of the cable case against rotation relative to the vehicle body irrespective of car models.

In a second aspect of the present invention, there is provided a steering device, which comprises a first steering shaft extending downward from a steering handle, a second steering shaft extending upward from a steering gear unit between a pair of steerable wheels, and an actuator connected between the first and second steering shafts for transmitting rotation therebetween and being capable of altering the transmission ratio of the rotation in dependence on the traveling state. The steering device further comprises an input side connection shaft provided at an upper end portion of the actuator and connected to the first steering shaft through fitting engagement to be rotatable bodily therewith, an output side connection shaft protruding from the lower end surface of the actuator and connected to the second steering shaft through fitting engagement to be rotatable bodily therewith, a rubber boot covering the circumferential surface and the lower end surface of the actuator and allowing the output side connection shaft to pass through a portion thereof covering the lower end surface, the boot having an upper end portion fixedly fitted on the actuator, and a bracket for fixing an axial intermediate portion of the rubber boot to a dashboard of a vehicle body. In the steering device, with the rubber boot fixed to the dashboard through the bracket and with the first steering shaft carried rotationally by the vehicle body, the input side connection shaft and the first steering shaft are brought into face-to-face relation by moving the actuator downward as the rubber boot is deformed compressively, and are connected to each other through fitting engagement then by moving the actuator upward. The steering device is further provided with a cap made of a member which is higher in elasticity than another member composing a lower end corner portion of the actuator, for covering the lower end corner portion of the actuator.

With the construction in the second aspect, since the lower end corner portion of the actuator is covered with the cap which is higher in elasticity, the damage of the rubber boot can be avoided even when the lower end corner portion of the actuator is brought into hit on the rubber boot during the assembling work.

BRIEF DESCRIPTION OF THE
ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED
EMBODIMENTS

First Embodiment

Hereafter, a first embodiment according to the present invention will be described with reference to FIGS. 1 through 12.

Figure 1:
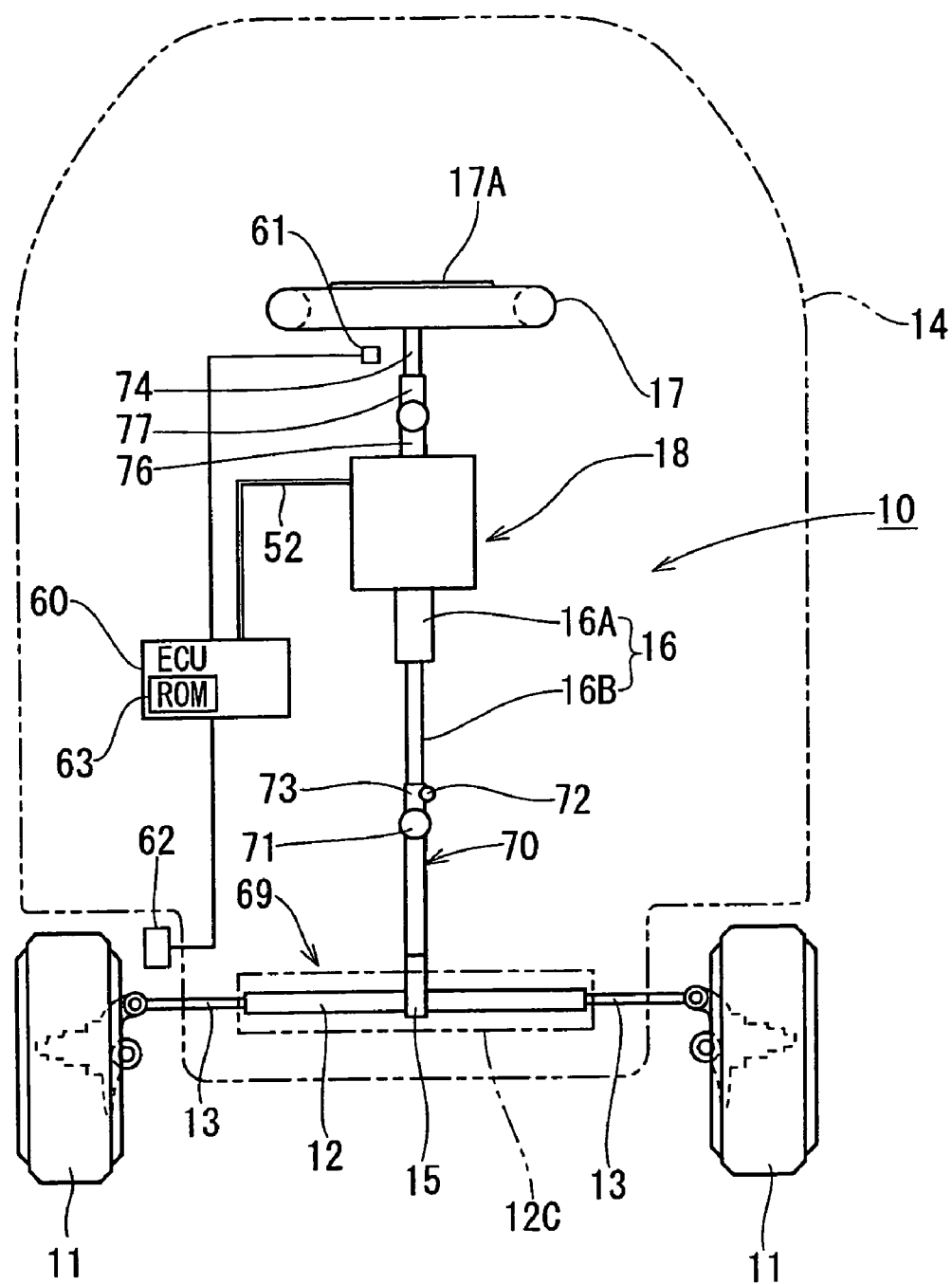
FIG. 1 is a conceptual illustration of a vehicle provided with a steering device common to first and second embodiments according the present invention.
Figure 2:
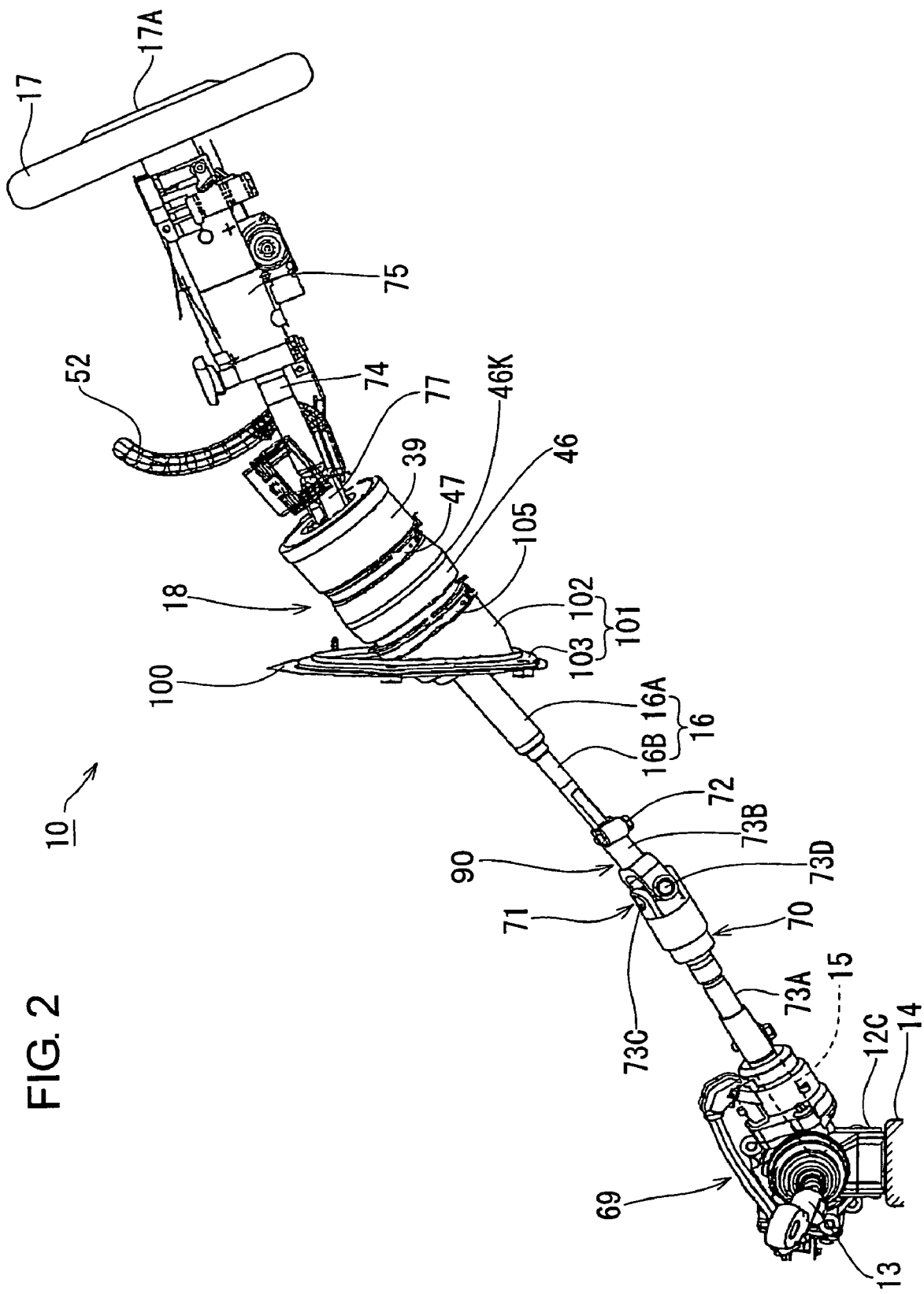
FIG. 2 is a side view of the steering device in the first embodiment.

FIG. 1 shows a vehicle provided with a steering device 10 according to the present invention. A steering gear unit 69 is provided between a pair of front wheels 11, 11 (corresponding to steerable wheels in the present invention) provided on the vehicle. The steering gear unit 69 is of the structure that a pinion 15 is meshing with a rack 12 passing through a cylindrical rack case 12C. The rack case 12C is fixed a vehicle body 14, and the rack 12 is connected at its opposite ends to the respective front wheels 11, 11 through tie rods 13, 13. As shown in FIG. 2, the pinion 15 and a steering handle 17 are connected through a steering shaft 90, and an actuator 18 is provided at an intermediate portion of the steering shaft 90.

Specifically, the steering shaft 90 is composed of a first steering shaft 74 (corresponding to an upper side portion of a steering shaft in the present invention) on the steering handle 17 side and a second steering shaft 70 (corresponding to a lower side portion of the steering shaft in the present invention) on the steering gear unit 69 side, and the actuator 18 is connected between the first and second steering shafts 74 and 70. The second steering shaft 70 is provided with a universal joint 71 at an intermediate portion thereof, and a base shaft 73A extending downward from the universal joint 71 is connected to the pinion 15 in axial alignment with the same, whereas a connection sleeve 73B extending upward from the universal joint 71 is tiltable relative to the base shaft 73A.

The universal joint 71 is biforked at an upper end portion of the base shaft 73A as well as at a lower end portion of the connection sleeve 73B and is constructed so that a first shaft 73C whose opposite ends are carried on the base shaft 73A intersects perpendicularly with a second shaft 73D whose opposite ends are carried on the connection sleeve 73B. Thus, rotation can be transmitted between the base shaft 73A and the connection sleeve 73B with the rotational axes of the base shaft 73A and the connection sleeve 73B intersecting with each other at a certain angle. And, the connection sleeve 73B takes a cylindrical shape and has a spline formed at an internal surface thereof. Further, at an upper end of the connection sleeve 73B, there is provided a bolt 72 for shrinking the diameter of the connection sleeve 73B.

In FIG. 2, a numeral 75 denotes a column assy (or assembly), which is attached to an installment panel reinforcement (not shown) provided in the vehicle body 14. The column assy 75 is able to vary its angle relative to the vehicle body 14 in a vertical direction, as applied in ordinary vehicles. The first steering shaft 74 is rotatably carried in the column assy 75. The steering handle 17 is removably attached to a portion (refer to FIG. 3) protruding from the upper end of the column assy 75 of the first steering shaft 74. Further, the steering handle 17 is provided with an airbag 17A.

Figure 4:
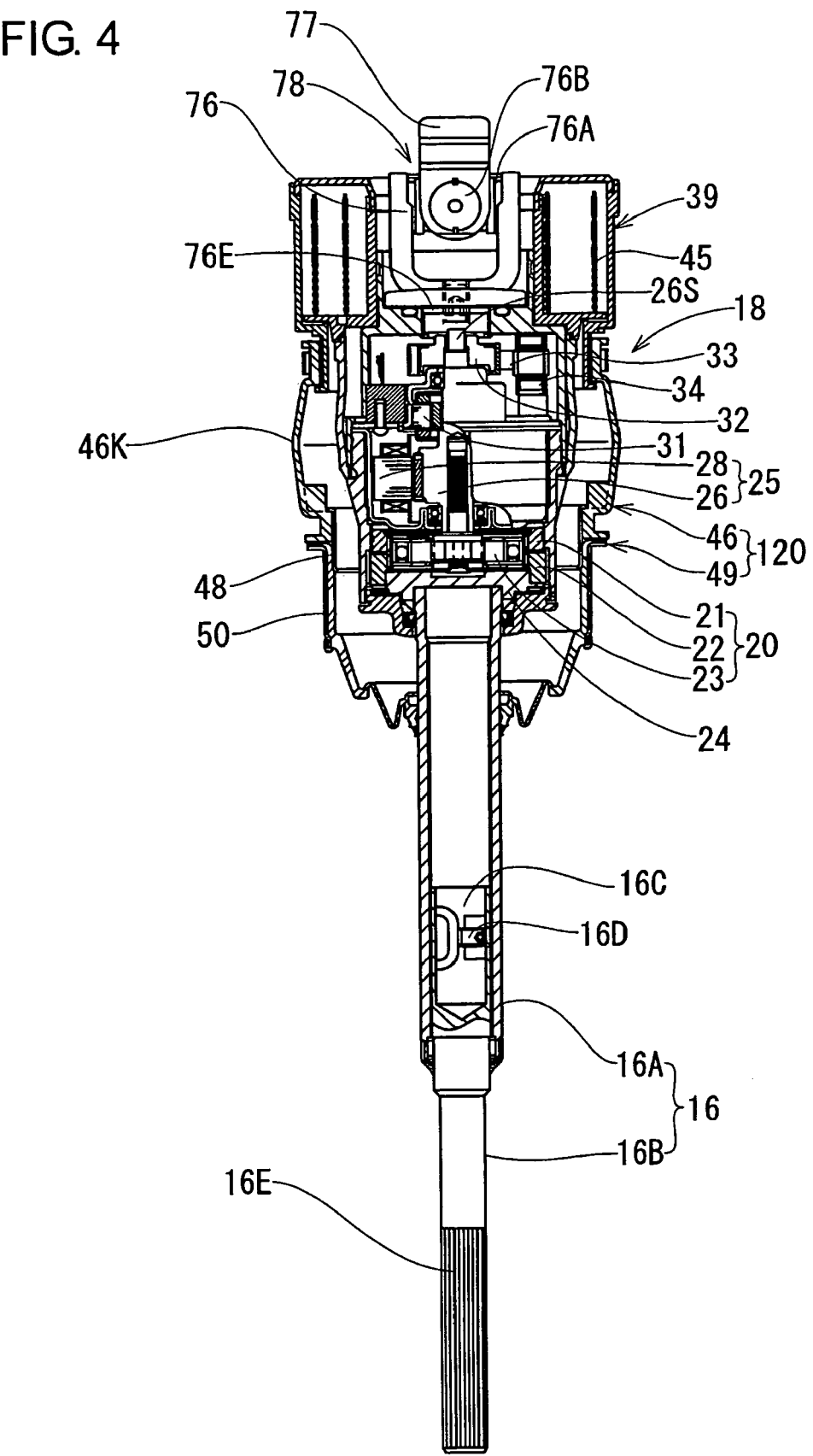
FIG. 4 is a sectional view showing an actuator section of the steering device in the first embodiment.
Figure 5:
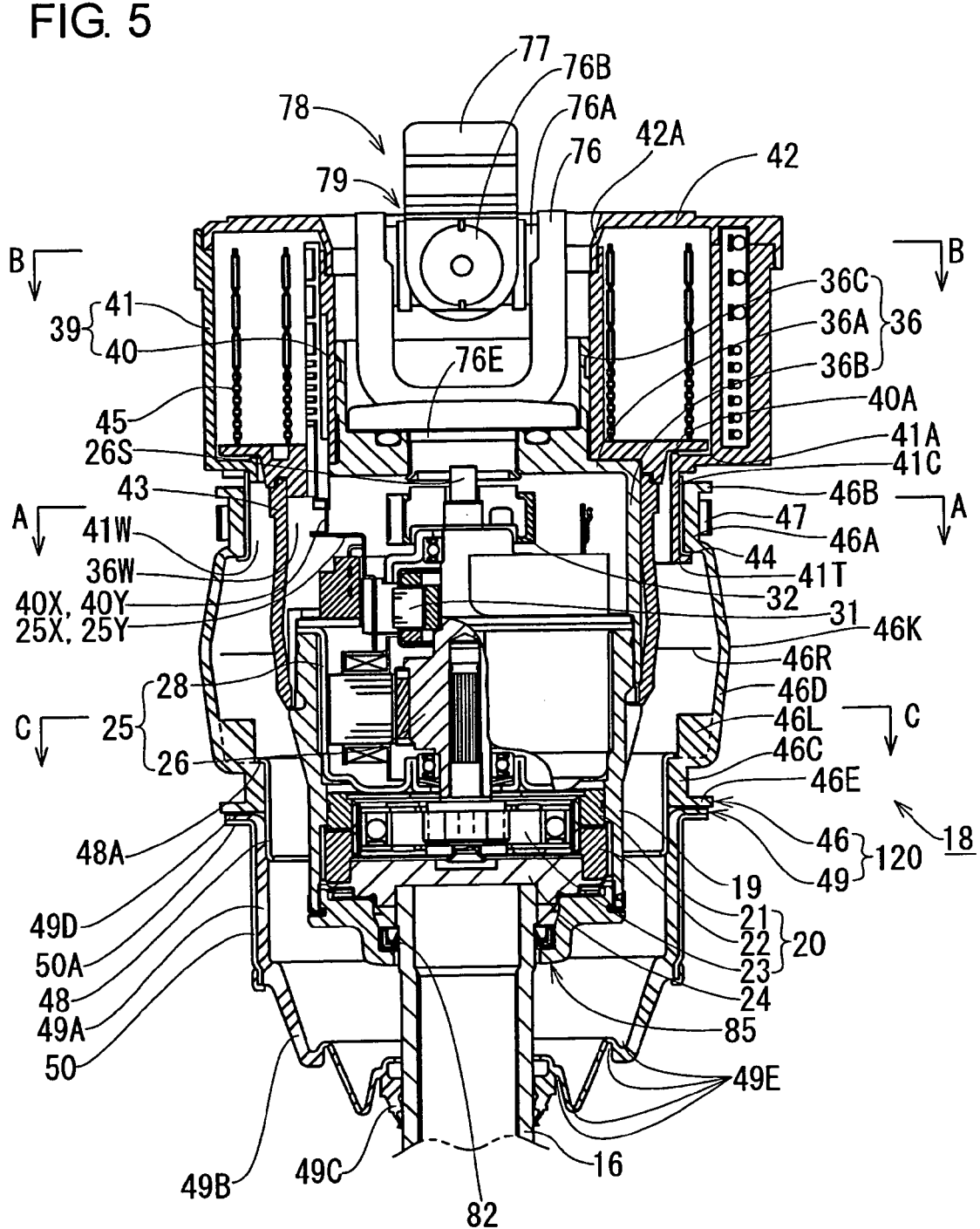
FIG. 5 is an enlarged sectional view of the actuator section shown in FIG. 4.

As shown in FIGS. 4 and 5, the actuator 18 is provided with a differential type reduction gear 20 and an electric motor 25 for driving the reduction gear 20. A pair of outer rings 21, 22 are axially juxtaposed in the reduction gear 20. Each of the outer rings 21, 22 has plural fine teeth formed at its internal surface, and one of the outer rings 22 is set to be fewer by, e.g., one in tooth number than the other outer ring 21. An inner ring 23 is commonly fitted in the outer rings 21, 22 and is provided at a circumferential surface thereof with plural fine teeth being able to be meshed commonly with the teeth of the both outer rings 21, 22. Further, the inner ring 23 is formed to be ellipse or oval, so that a part of the teeth of the inner ring 23 is in meshing with parts of the teeth of the outer rings 21, 22.

The motor 25 is arranged at an upper side of the reduction gear 20 in axial alignment with the same. A rotor 26 of the motor 25 is coupled to the inner ring 23 of the reduction gear 20 to be rotatable bodily. And, a stator 28 of the motor 25 and the outer ring 21 at the upper side are fixedly fitted in an assy sleeve 19.

On the other hand, the outer ring 22 at the lower side is allowed to rotate relative to the assy sleeve 19. Thus, when the inner ring 23 is drivingly rotated by the motor 25, the outer ring 22 at the lower side is rotated faster than the outer ring 21 at the upper side because the former is fewer by one in tooth number than the latter. That is, the outer ring 22 is rotated slightly by an angle corresponding to one tooth upon one rotation of the inner ring 23, so that the speed reduction effect can be obtained between the motor 25 and the outer ring 22.

The outer ring 22 is coupled to an output side connection shaft 16. Specifically, as shown in FIG. 4, the output side connection shaft 16 is composed of a first shaft component 16A of a pipe shape and a second shaft component 16B inserted into the lower end portion of the first shaft component 16A, and a coupling disc 24 is provided at the upper end portion of the first shaft component 16A. The coupling disc 24 is fixed to the outer ring 22 to be rotatable bodily therewith.

The second shaft component 16B is provided at its upper end portion with a friction engagement portion 16C, which is urged to be pressured upon the lower end internal surface of the first shaft component 16A. Usually, the upper end portion of the second shaft component 16B is held on the lower end portion of the first shaft component 16A through the friction engagement between the friction engagement portion 16C and the lower end internal surface of the first shaft component 16A. However, when an axis force which is greater than a predetermined value is axially applied on the output side connection shaft 16, the second shaft component 16B is pushed into the first shaft component 16A, so that the output side connection shaft 16 becomes short as a whole. The friction force at the friction engagement portion 16C is adjustable by screw adjustment of a setting screw 16D provided at the friction engagement portion 16C.

As shown in FIG. 5, a closing cap 85 is attached to a lower end opening of the assy sleeve 19. The output side connection shaft 16 passes through the center of the closing cap 85. An oil seal 82 sticking firmly to the output side connection shaft 16 is provided at the internal surface of a portion of the closing cap 85 where the output side connection shaft 16 passes through.

Figure 6:
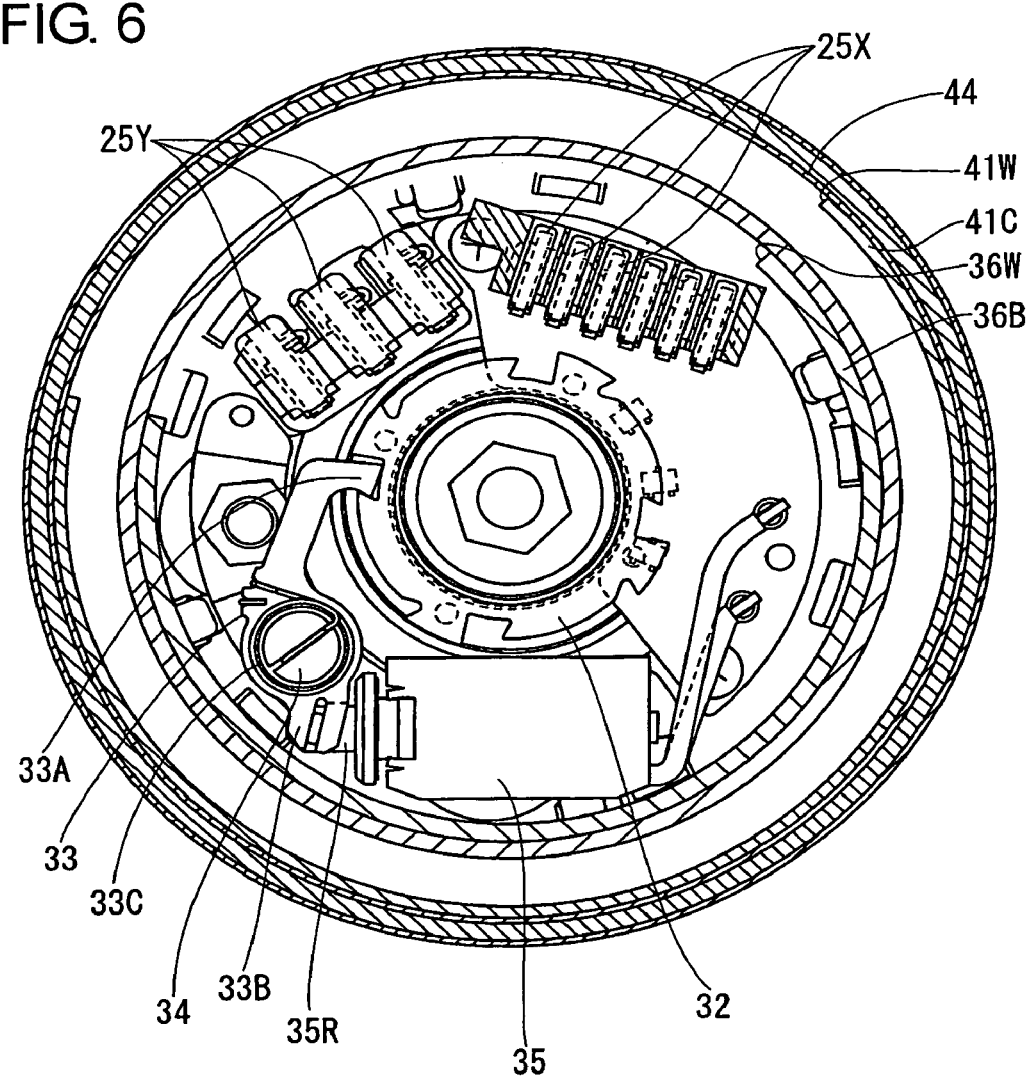
FIG. 6 is a cross-sectional view taken along the line A-A in FIG. 5 and FIG. 17.

Also in FIG. 5, a position sensor 31 for detecting the rotational position of the rotor 26 is provided on the upper end portion of the motor 25. A rotary shaft 26S provided at the center of the rotor 26 protrudes from the upper end surface of the motor 25, and a lock disc 32 is fixed to a protruding portion of the rotary shaft 26S to be rotatable bodily therewith. Further, as shown in FIG. 6, a pillar 34 is upstanding at a position adjacent to the circumferential edge of the upper surface of the motor 25, and a lock arm 33 is pivotably carried on the pillar 34. The lock arm 33 is urged by a torsion spring 33C to be engaged with the lock disc 32 and is released from engagement with the lock disc 32 by energizing a solenoid 35 provided on the upper surface of the motor 25. Thus, when the energization of the solenoid 35 is discontinued in the state of emergency, the rotor 26 is brought into the lock state.

On the upper surface of the motor 25, there are provided a terminal furniture 25X for windings of the motor 25 and the solenoid 35 and a terminal furniture 25Y for the position sensor 31.

As shown in FIG. 5, the upper end portion of the motor 25 is covered with a coupling housing 36. The coupling housing 36 is provided with a top plate portion 36A facing the upper surface of the motor 25, a large-diameter cylindrical portion 36B extending downward from the top plate portion 36A and a small-diameter cylindrical portion 36C extending upward from the top plate portion 36A. The lower end portion of the large-diameter cylindrical portion 36B is fixedly fitted on the upper end portion of the assy sleeve 19.

As shown in FIG. 6, the large-diameter cylindrical portion 36B is partly cut away to form a work window 36W. The work window 36W enables the terminal furniture 25X and the terminal furniture 25Y to face outside therethrough. The work window 36W is closed by means of an inside cylindrical member 43 referred to later.

As shown in FIG. 5, an input side connection shaft 78 is fixed to the inside bottom surface of the small-diameter cylindrical portion 36C. Specifically, the input side connection shaft 78 is provided with a universal joint 79 at an intermediate portion thereof and is further composed of a base section 76 and a joint sleeve 77 respectively at lower and upper sides of the universal joint 79. The base section 76 takes a U-letter shape, and an embossment 76E protrudes from the lower surface of a plinth provided beneath the base section 76. The embossment 76E is fitted in a center hole formed in the inside bottom surface of the small-diameter cylindrical portion 36C to align the base section 76 with the axis of the actuator 18.

The universal joint 79 is provided with a first shaft 76A whose opposite ends are carried on the base section 76 and a second shaft 76B rotatably carried and extending perpendicularly to the first shaft 76A, and the lower end portion of the joint sleeve 77 is fixed to the second shaft 76B. Thus, the base section 76 and the joint sleeve 77 are able to rotate bodily with a bent state being held between the base section 76 and the joint sleeve 77. The joint sleeve 77 is provided with a cylindrical space, whose internal surface has spine formed thereon. The first steering shaft 74 is spline-connected with the joint sleeve 77 by being inserted thereinto.

A cable case 39 is assembled on the upper portion of the coupling housing 36. The cable case 39 is constituted by fitting a case inner cylindrical component 40 and a case outer cylindrical component 41 to be rotatable relatively. The case inner cylindrical component 40 takes a cylinder shape fixed to the small-diameter cylindrical portion 36C of the coupling housing 36 and protrudes a circular bottom wall 40A at the lower end portion thereof. The circular bottom wall 40A of the case inner cylindrical component 40 is fixed at the lower end surface thereof to the upper end portion of the inside cylindrical member 43, and the inside cylindrical member 43 closes the work window 36W of the coupling housing 36, as mentioned earlier.

Figure 7:
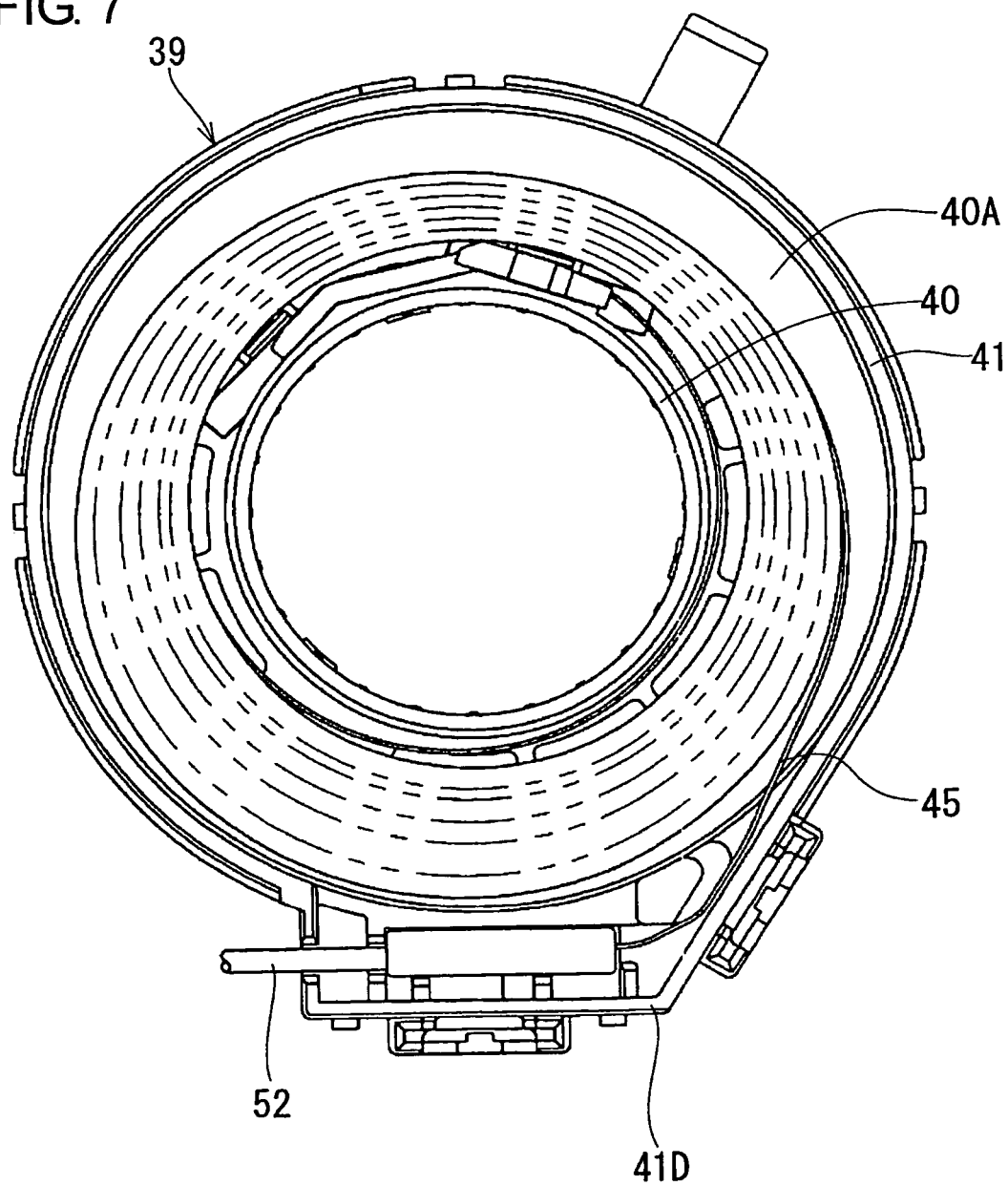
FIG. 7 is a cross-sectional view taken along the line B-B in FIG. 5 and FIG. 17.

On the other hand, the case outer cylindrical component 41 takes a generally cylindrical shape which has a lager inner diameter than the circular bottom wall 40A to surround the whole of the case inner cylindrical component 40 and expands a wire leading section 41D radially outward at a part of the circumferential surface thereof, as shown in FIG. 7. Further, an upper end opening of the case outer cylindrical component 41 is closed with a ring cap 42, as shown in FIG. 5. Additionally, a cylindrical wall 42A is suspended downward from the inner circumference of the ring cap 42, and the lower end portion of the cylindrical wall 42A is loosely fitted on the inside upper end portion of the case inner cylindrical component 40.

A ring-like bottom wall 41A protrudes radially inwardly from the lower end portion of the case outer cylindrical component 41 to be overlapped with the circular bottom wall 40A, and a boot holder sleeve 41C of a generally cylindrical shape is suspended downward from the inner circumference of the ring-like bottom wall 41A.

As shown in FIG. 6, a portion of the boot holder sleeve 41C which portion corresponds to the work window 36W of the coupling housing 36 is partly cut away to form another work window 41W. A sheet metal ring 44 is fitted on the outer surface of the boot holder sleeve 41C. The work window 41W is closed with the sheet metal ring 44. Further, as shown in FIG. 5, a flange portion 41T is protruded radially outwardly from the lower end circumference of the boot holder sleeve 41C, and the sheet metal ring 44 engages at its lower end portion with the flange portion 41T.

As shown in FIG. 7, a spiral cable 45 is housed in an annular space defined between the case inner cylindrical component 40 and the case outer cylindrical component 41. Specifically, the spiral cable 45 is wound around a cylindrical portion of the case inner cylindrical component 40 and is secured to the case inner cylindrical component 40 at its inside terminal portion and to the wire leading section 41D of the case outer cylindrical component 41 at its outside terminal portion. Inside the wire leading section 41D, plural electric paths provided in the spiral cable 45 are connected to an external cable 52, which is led outside the cable case 39.

Figure 8:
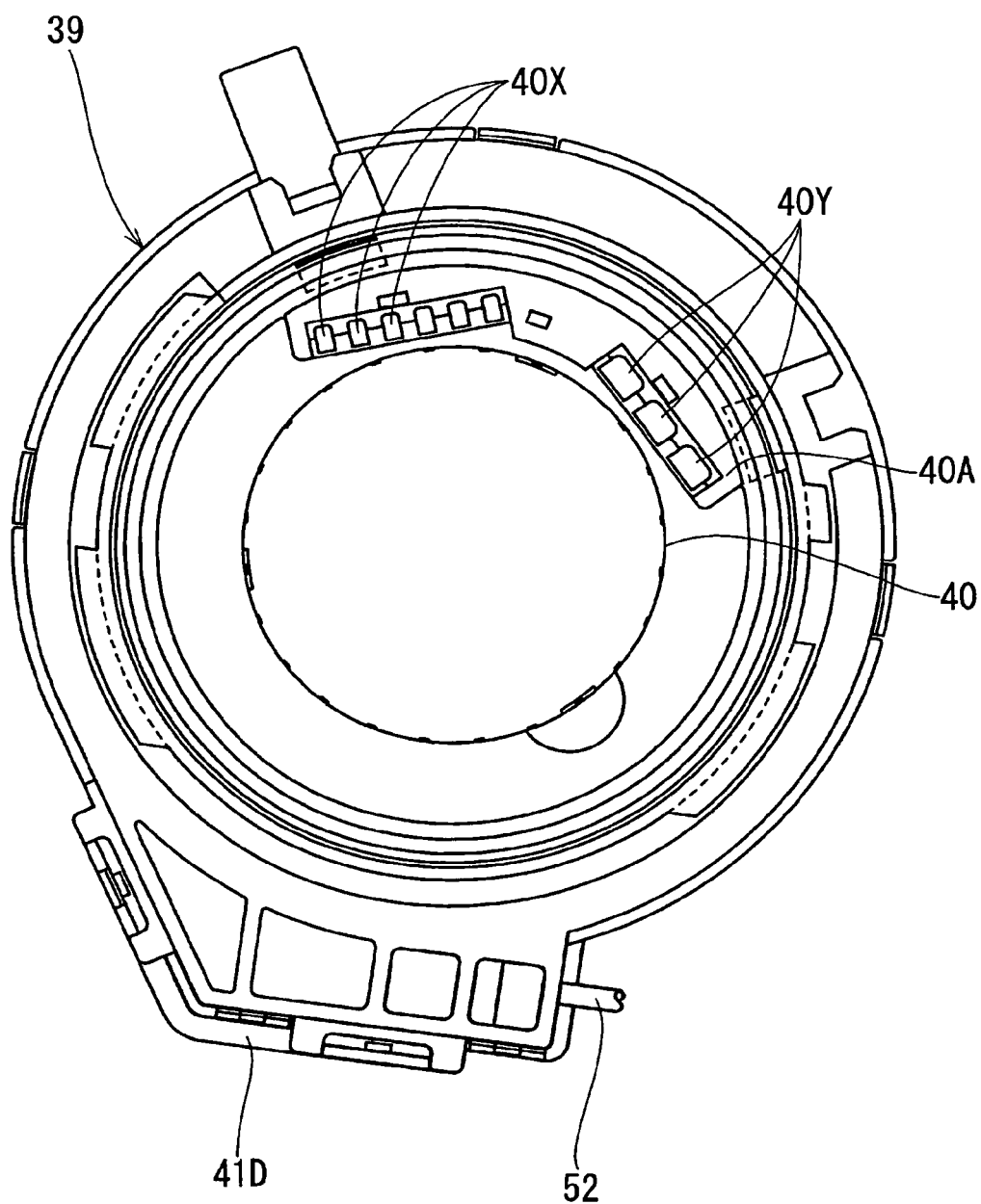
FIG. 8 is a top view of a cable case of the steering device in the first embodiment.
Figure 9:
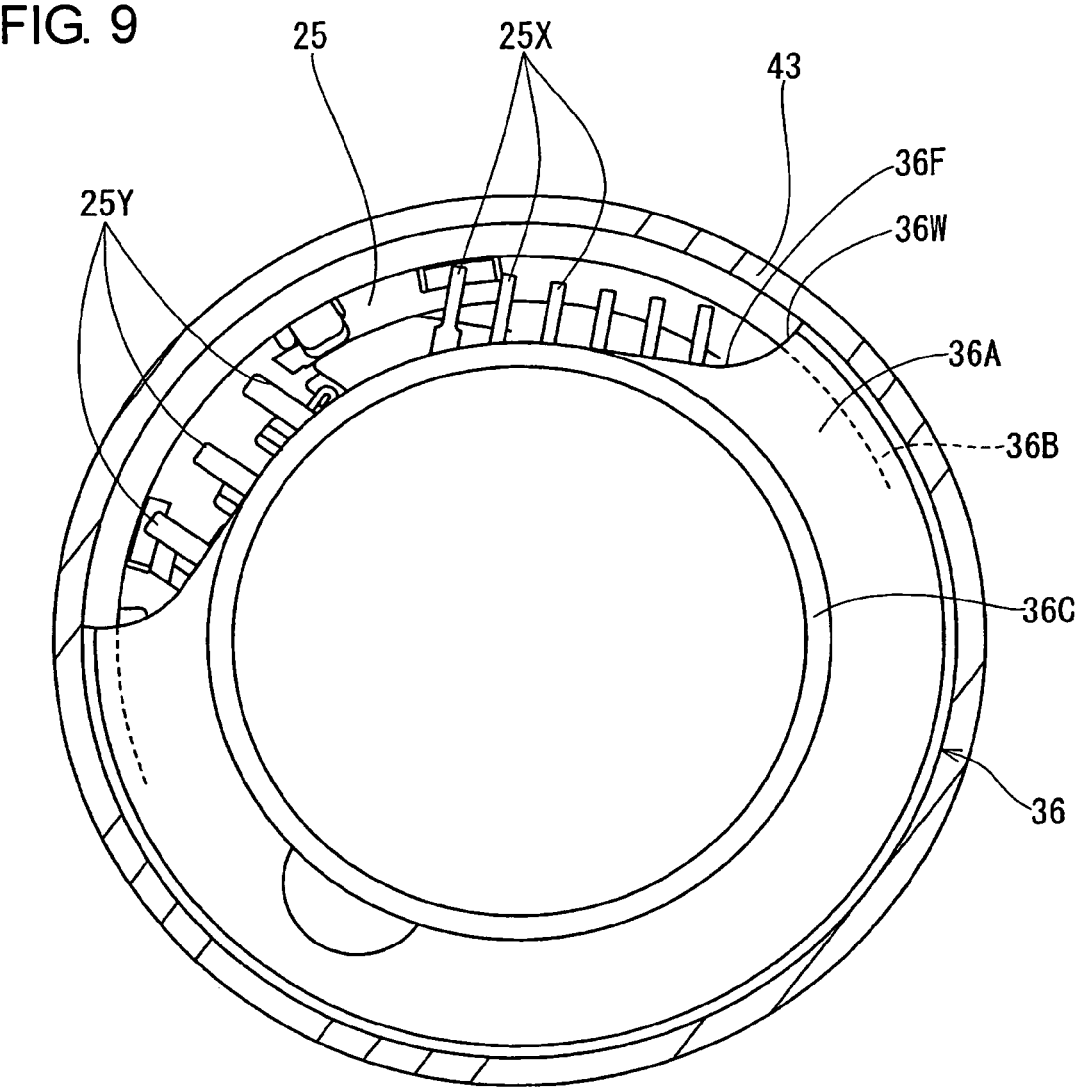
FIG. 9 is a bottom view of the cable case.

FIG. 8 is a bottom view of the cable case 39. As shown in this figure, the circular bottom wall 40A of the case inner cylindrical component 40 of the cable case 39 is provided thereon with plural terminal furniture 40X and 40Y respectively corresponding to the terminal furniture 25X for the motor 25 and the terminal furniture 25Y for the position sensor 31. These terminal furniture 40X, 40Y pass through the circular bottom wall 40A of the case inner cylindrical component 40 and are connected to plural electric paths provided in the spiral cable 45. As shown in FIG. 9, the top plate portion 36A of the coupling housing 36 has a cutout 36F formed for allowing the terminal furniture 40X and 40Y (refer to FIG. 8) to pass through in the vertical direction.

When the cable case 39 is attached to the coupling housing 36, the terminal furniture 40X, 40Y of the case inner cylindrical component 40 are brought into face-to-face relations respectively with the terminal furniture 25X for the motor 25 and the terminal furniture 25Y for the position sensor 31. At this time, the work windows 36W and 41W are kept opened, in which state the terminal furniture 40X, 40Y and the terminal furniture 25X, 25Y are brought into connection respectively while being observed through the work windows 36W and 41W. By providing the work windows 36W and 41W as described above, it becomes easy to connect the terminal furniture 40X, 40Y and the terminal furniture 25X, 25Y with each other respectively. Upon completion of the connecting work, it is proper to close the work windows 36W, 41W by attaching the aforementioned inside cylindrical member 43 and sheet metal ring 44 to the respectively set positions.

A first rubber boot 46 is attached to the boot holder sleeve 41C of the case outer cylindrical component 41. The first rubber boot 46 takes a cylindrical shape opened at opposite ends thereof and is fixed to the case outer cylindrical component 41 in such a manner that an upper end fitting portion 46A provided at the upper end is fitted on the outer surface of the sheet metal ring 44 fitted on the boot holder sleeve 41C and that then, a clamp ring 47 is clamped on the outer surface of the upper end fitting portion 46A. The upper end portion of the upper end fitting portion 46A radially outwardly extends a flange portion 46B for ensuring that the upper end fitting portion 46A is prevented from coming out therefrom.

Figure 10:
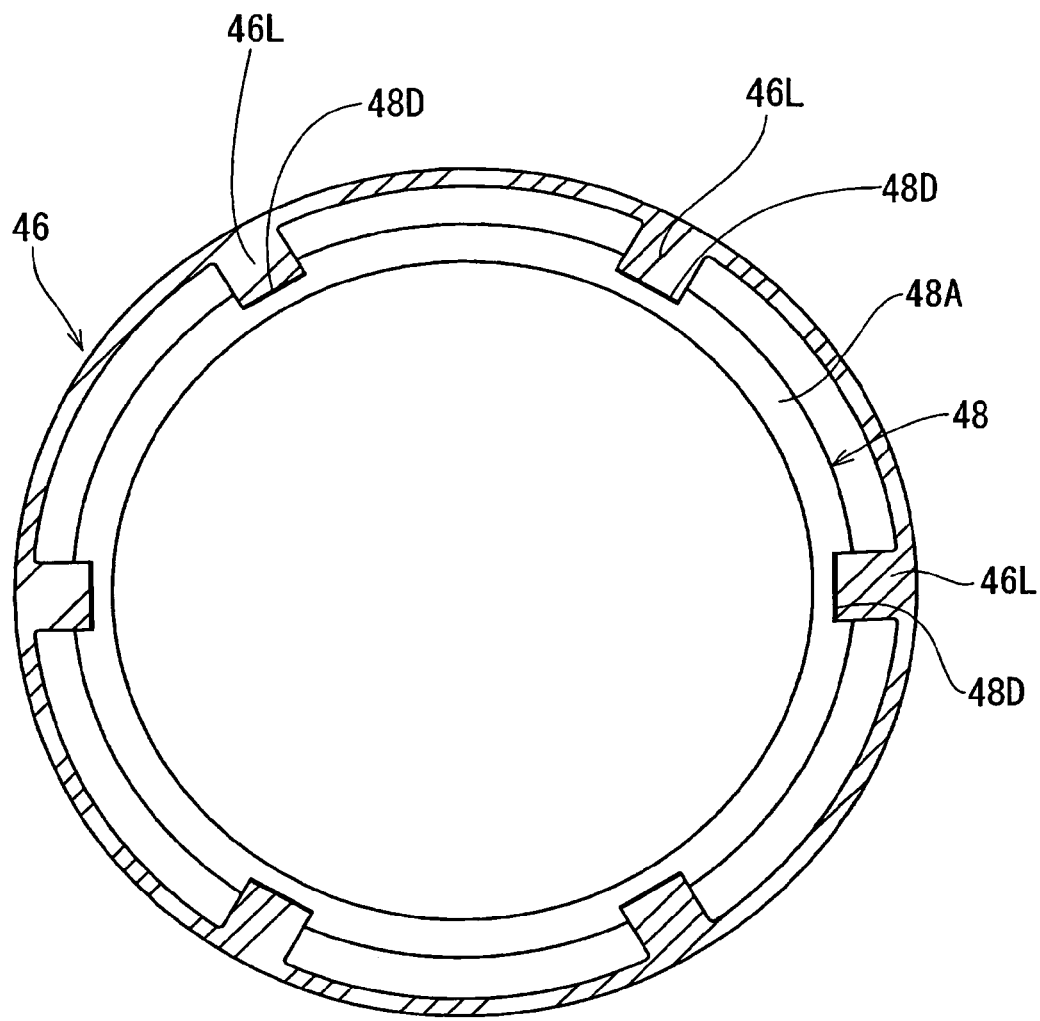
FIG. 10 is a cross-sectional view taken along the line C-C in FIG. 5 and FIG. 17.

The first rubber boot 46 is formed at its lower end portion with a lower end fitting portion 46C which is approximately the same in diameter as the upper end fitting portion 46A and is provided between the upper and lower fitting portions 46A, 46C with a cylindrical body portion 46D whose diameter is larger than those of the fitting portions 46A, 46C. The cylindrical body portion 46D is constructed to join a pair of taper cylinders arranged in alignment vertically so that the center portion in the axial direction becomes largest in diameter. A bendable portion 46K having a ridge line 46R is formed at the center portion in the axial direction of the cylindrical body portion 46D. Further, plural engaging protrusions 46L arranged circumferentially are formed on the internal surface at a boundary portion with the lower end fitting portion 46C of the cylindrical body portion 46D. More specifically, as shown in FIG. 10, the engaging protrusions 46L are formed at six positions which equally divides the circumference of the first rubber boot 46.

As shown in FIG. 5, a flange portion 46E overhangs radially outwardly from the lower end circumference of the lower end fitting portion 46C. An inner metal sleeve 48 is inserted into the internal surface of the lower end fitting portion 46C. The inner metal sleeve 48 is prevented from coming out therefrom by engaging a flange portion 48A, which overhangs radially outwardly from the upper end portion thereof, with the inside upper circumferential edge portion of the lower end fitting portion 46C. Further, as shown in FIG. 10, the flange portion 48A has pit portions 48D formed at the six positions equally dividing the circumference thereof, and these pit portion 48D receives the engaging protrusions 46L therein thereby to secure the inner metal sleeve 48 against rotation relative to the first rubber boot 46.

As shown in FIG. 5, the inner metal sleeve 48 is fitted at its upper half in the lower end fitting portion 46C and protrudes its lower half downward from the lower end fitting portion 46C. A second rubber boot 49 has its upper end portion fitted on the lower half of the inner metal sleeve 48 and vulcanized to be adhered thereto. Thus, the first and second rubber boots 46, 49 are fixed bodily to constitute a rubber boot 120 in the present invention.

The second rubber boot 49 takes a cylindrical shape opened at opposite ends thereof and is provided with a cylindrical body section 49A, a bellows section 49B and a seal section 49C in turn from top toward bottom. An outer metal sleeve 50 (corresponding to a metal sleeve in the present invention) is fitted on the outer surface of the body section 49A and is adhered to the body section 49A by vulcanizing the same. A flange portion 50A overhangs radially outwardly from the upper end portion of the outer metal sleeve 50, and a flange portion 49D overhangs radially outwardly from the upper end portion of the body section 49A to be overlapped over the flange portion 50A.

The bellows section 49B as a whole decreases in diameter as it goes down and takes a so-called bellows construction that plural bendable portions 49E are provided at the intermediate portion in the axial direction. The seal section 49C is closely fitted on the circumferential surface of the output side connection shaft 16. However, when the output side connection shaft 16 is rotated in connection with the steering manipulation of the steering handle 17, the seal section 49C allows the output side connection shaft 16 to slidden thereon. In this way, by covering the whole of the actuator 18 with the first rubber boot 46 and the second rubber boot 49 and by making the seal section 49C at the lower end portion of the second rubber boot 49 closely fitted on the output side connection shaft 16 to allow the same slidably thereon, there can be attained not only a waterproof effect and a dustproof effect but also a soundproof effect against the operating noise of the actuator 18.

Figure 3:
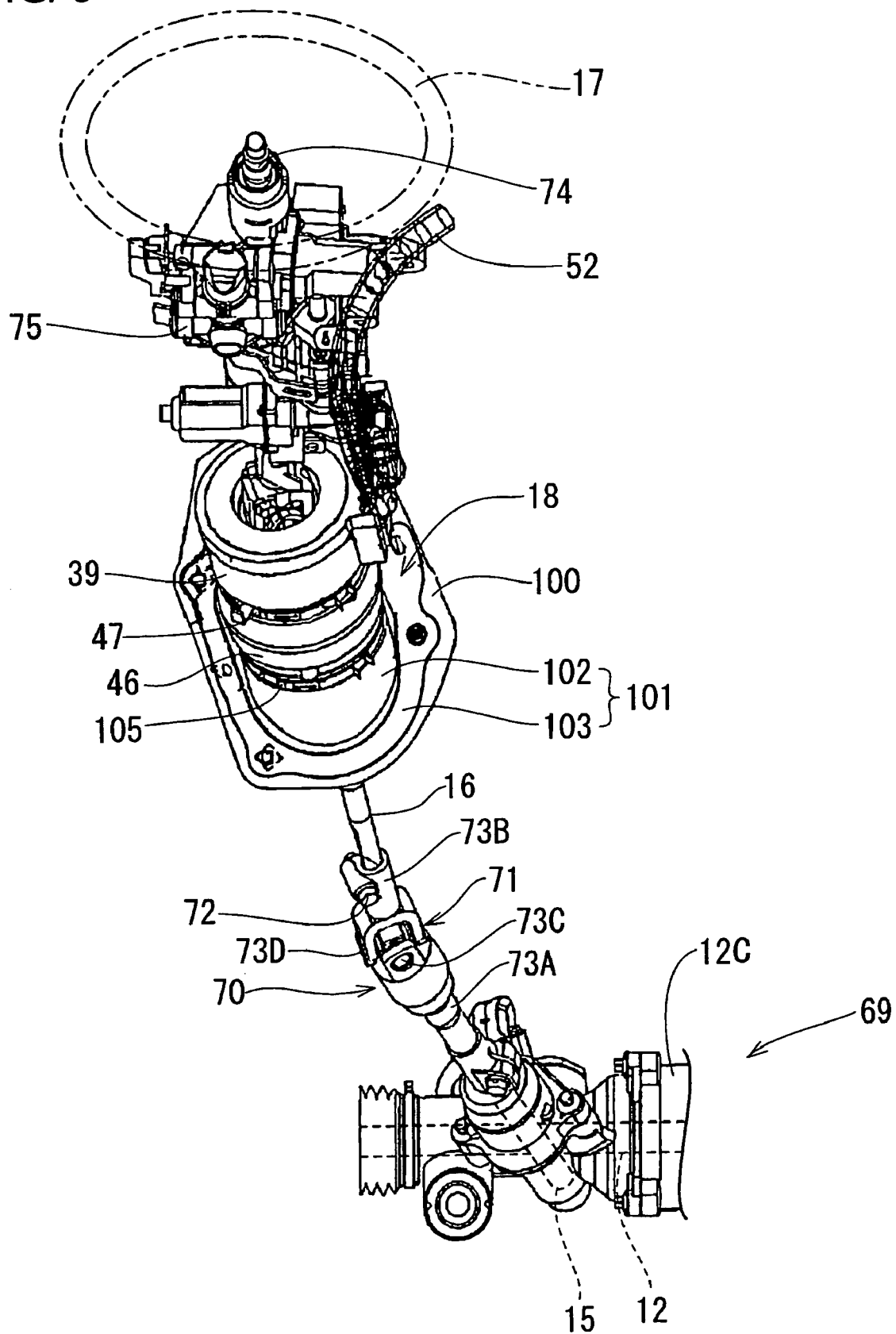
FIG. 3 is a perspective view of the steering device in the first embodiment.
Figure 11:
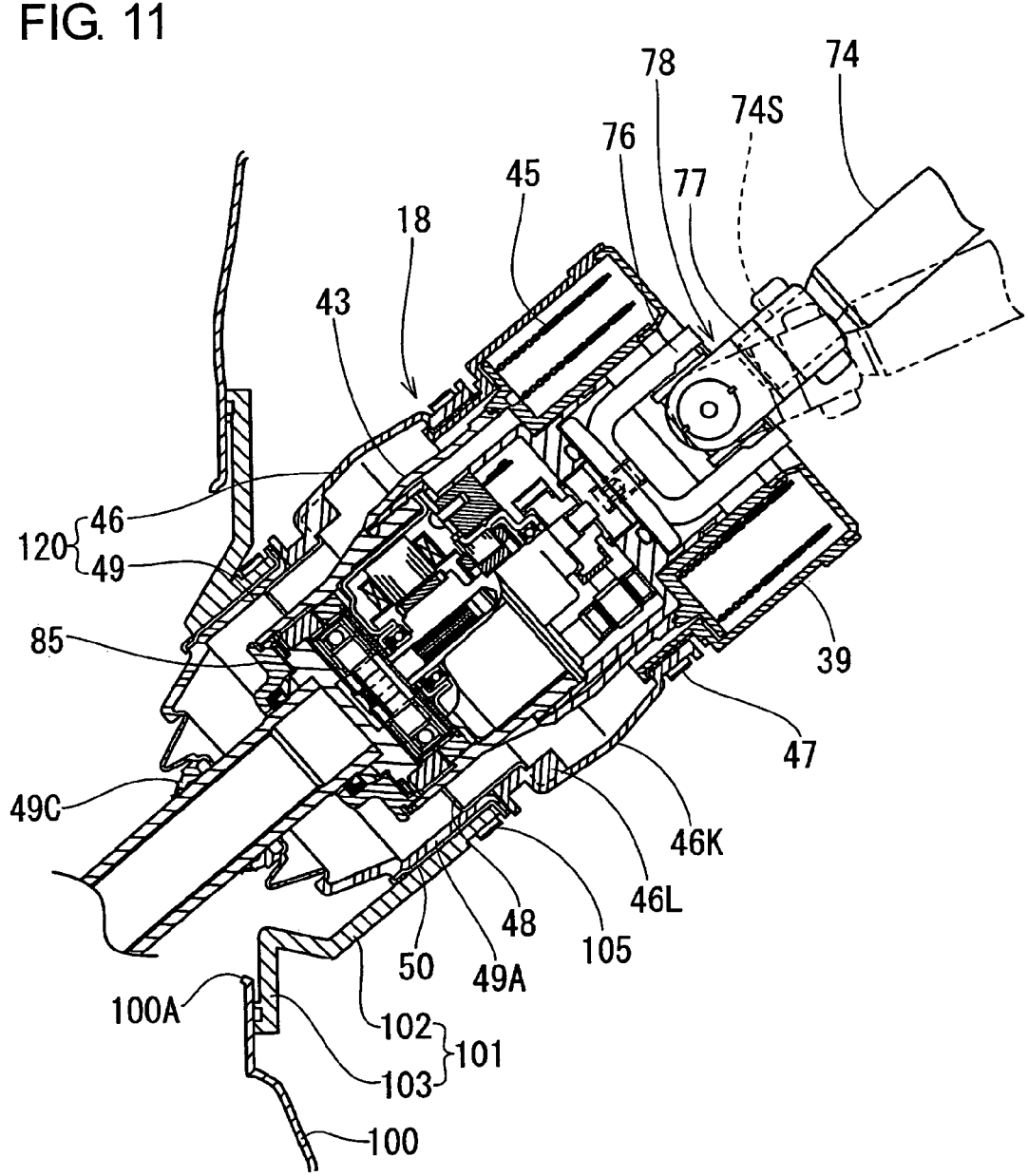
FIG. 11 is a sectional view of the actuator section attached to a dashboard.

As shown in FIG. 11, a boot insertion bracket 101 for fixing the actuator 18 to a dashboard 100 of the vehicle body 14 is fitted and attached onto the outer surface of the outer metal sleeve 50. The boot insertion bracket 101 is made of rubber and is constructed to erect a cylindrical portion 102 obliquely upward from a flat plate portion 103 which is set on the opening edge portion of a through hole 100A formed on the dashboard 100. As shown in FIG. 3, the flat plate portion 103 is fixed by means of plural bolts to the dashboard 100 at its whole circumferential portion. Further, the actuator 18 is fitted in the cylinder portion 102 at the outer metal sleeve 50 thereof and is positioned with the flange portion 50A of the outer metal sleeve 50 being seated on the upper end surface of the cylindrical portion 102. Further, a clamp ring 105 is attached to the circumferential surface of the upper end portion of the cylinder portion 102. By clamping the clamp ring 105 with the outer metal sleeve 50 placed inside the cylinder portion 102, the actuator 18 is prevented from coming out as well as from rotating.

Operation of First Embodiment

The steering device 10 as constructed above will be assembled to the vehicle body 14 as follows:

Before assembling the actuator 18, the steering gear unit 69 is fixed to a bottom portion of the vehicle body 14 in advance, and the column assy 75 is fixed to the installment panel reinforcement in advance. Also, in advance, the boot insertion bracket 101 is fixed to the dashboard 100. Thus, the first and second steering shafts 74, 70 are placed to face each other with the dashboard 100 therebetween. The steering handle 17 is left released from the first steering shaft 74 of the column assy 75.

Next, the actuator 18 is inserted into the cylindrical portion 102 of the boot insertion bracket 101. At this time, the assembling of the rubber boot 120 into the boot insertion bracket 101 can be done smoothly since the outer metal sleeve 50 fixedly attached to the outer surface of the rubber boot 120 slides on the internal surface of the cylindrical portion 102. Then, the output side connection shaft 16 protruding from the lower end of the boot insertion bracket 101 is inserted into the through hole 100A of the dashboard 100 and is spline-connected to the second steering shaft 70. In this state, the clamp ring 105 is clamped on the circumferential surface of the boot insertion bracket 101 to fix the rubber boot 120 of the actuator 18 to the boot insertion bracket 101 (that is, to secure the actuator 18 against rotation and coming out). Since the rubber boot 120 is reinforced with the outer metal sleeve 50, the rubber boot 120 and the boot insertion bracket 101 can be fixed firmly.

Figure 12:
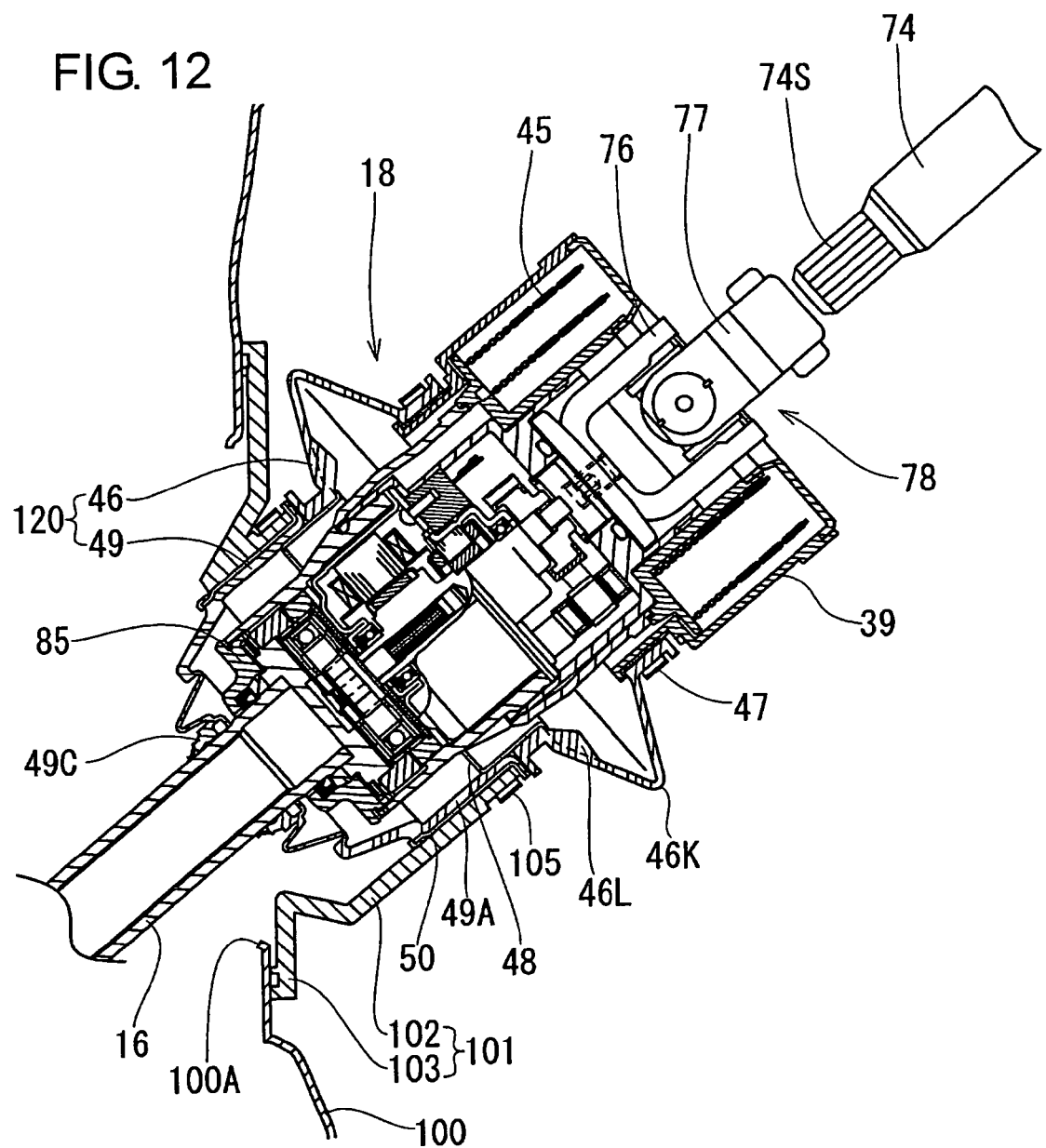
FIG. 12 is a sectional view of the actuator section attached to the dashboard with a rubber boot being compressively deformed.
Figure 13:
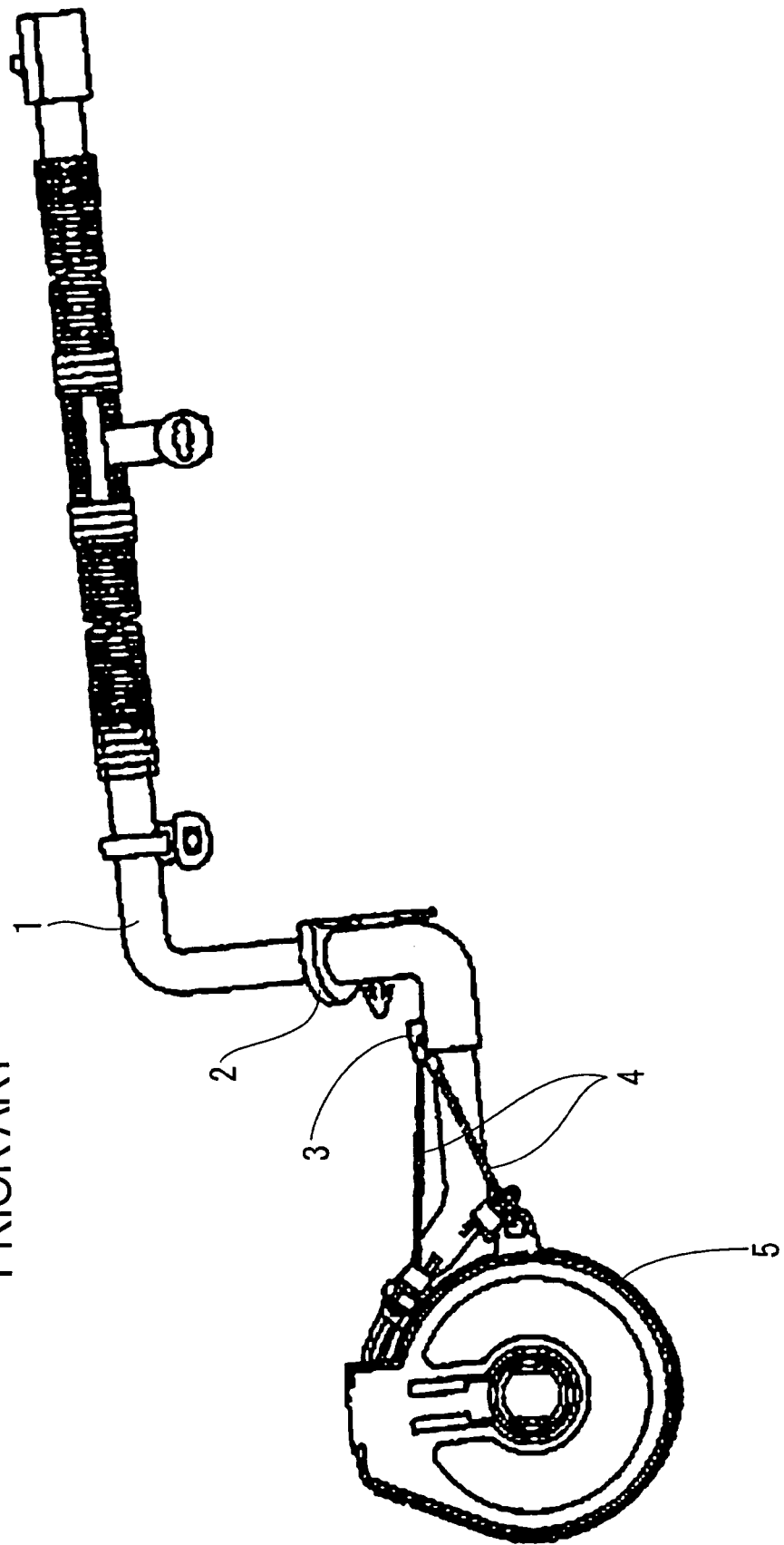
FIG. 13 is a plan view of a prior art steering device.
Figure 14:
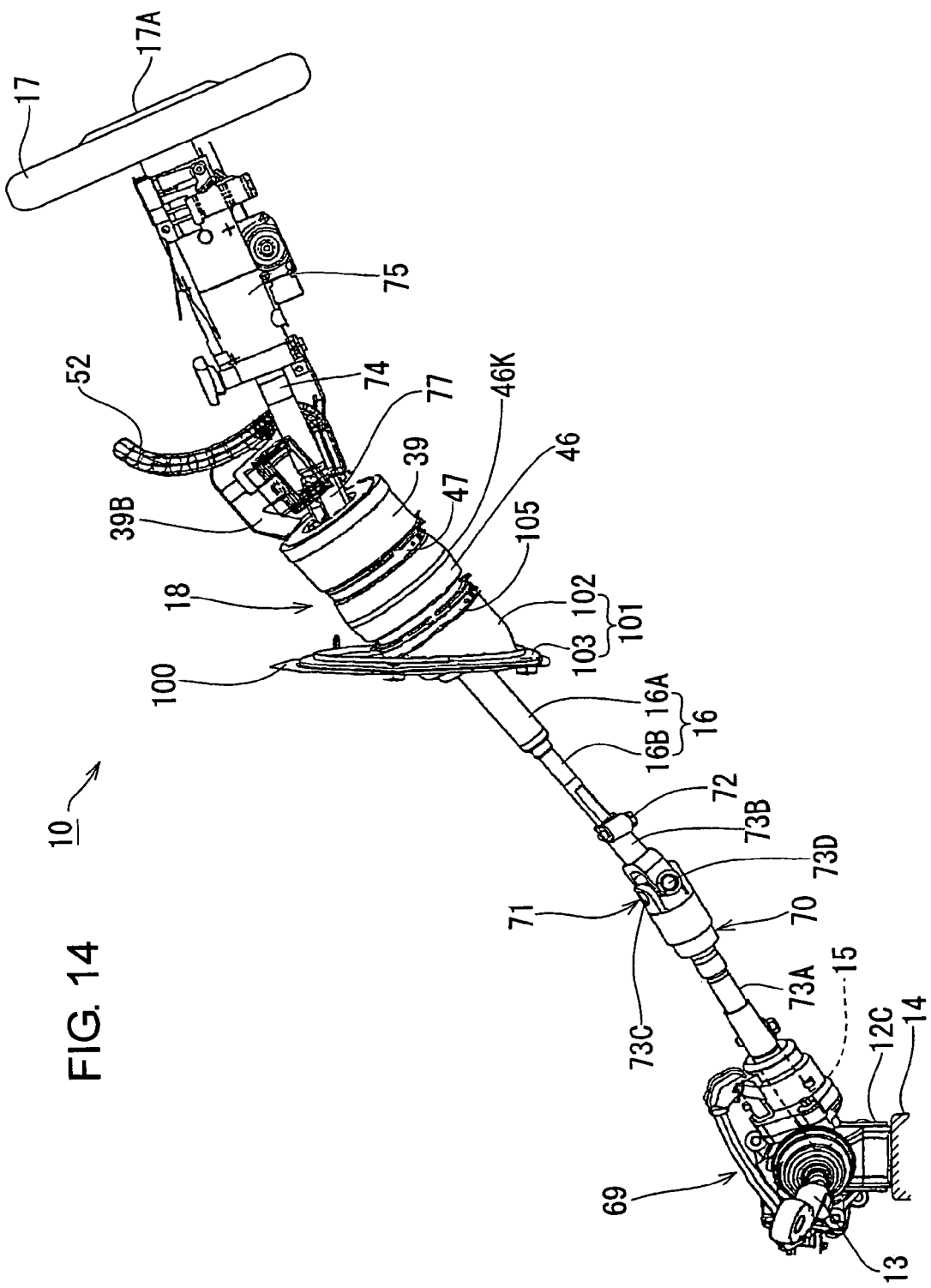
FIG. 14 is a side view of a steering device in the second embodiment according to the present invention.

Subsequently, the actuator 18 is pushed down as shown in FIG. 12. More specifically, this can be done by gripping the cable case 39 and then by pushing it down. Thus, the first rubber boot 46 is compressively deformed by being crushed down at the bendable portion 46K, whereby the actuator 18 is moved downward relative to the first and second rubber boots 46, 49. By providing the rubber boot 120 with the bendable portion 46K as described above, the rubber boot 120 is enabled to be easily deformed in the axis direction, so that it can be realized to efficiently perform the assembling work of the actuator 18 onto the steering shaft 90.

Thereafter, the joint sleeve 77 of the input side connection shaft 78 and the first steering shaft 74 are brought to face with each other with the actuator 18 having been moved down. Then, the actuator 18 is moved upward to insert the lower end portion of the first steering shaft 74 into the joint sleeve 77. Thus, the first steering shaft 74 is spline-connected to the input side connection shaft 78 of the actuator 18. Then, the bolt 72 (FIG. 2) provided on the second steering shaft 70 is screwed up to secure the output side connection shaft 16 against coming out from the second steering shaft 70.

Finally, the external cable 52 led from the actuator 18 is connected to an ECU (the abbreviation of Electronic Control Unit) 60 shown in FIG. 1. Through the foregoing works, the actuator 18 is assembled to the vehicle body 14, whereby the steering device 10 is completed.

In the vehicle incorporating the steering device 10 as constructed above, the ECU 60 drivingly controls the actuator 18 in dependence on the traveling state to alter the transmission ratio of the rotation transmitted between the first and second steering shafts 74, 70. More specifically, a ROM 63 (shown in FIG. 1) provided in the ECU 60 stores a map (not shown) wherein various transmission ratios have been set respectively in correspondence to various vehicle speeds. Thus, the ECU 60 determines a transmission ratio to be selected based on a detection result of a vehicle speed sensor 62 (refer to FIG. 1) and the map. Then, the ECU 60 calculates a target rotational angle for the output side connection shaft 16 from the steering angle of the steering handle 17 detected by a steering angle sensor 61 and the determined transmission ratio. In order to make the actual rotational angle of the output side connection shaft 16 coincide with the target rotational angle, the ECU 60 applies a drive current to the motor 25 through the external cable 52 and the spiral cable 45 thereby to rotate the rotor 26.

The map has been set to have a property that the transmission ratio becomes smaller as the vehicle speed increases. Thus, it becomes realized that the front wheels 11, 11 can be steered through a slight manipulation of the steering handle 17 in a low speed range, whereby the capability of turning the vehicle can be heightened. In a high speed range, on the contrary, a so-called sharp handling is restricted, whereby a stable traveling can be realized.

By the way, when the steering handle 17 is rotated, a relative rotation is made between the case outer cylindrical component 41 fixed to the dashboard of the vehicle body 14 through the rubber boot 120 and the case inner cylindrical component 40 fixed to the actuator 18. This results in changing the winding state of the spiral cable 45 whose opposite ends are fixed to the case outer cylindrical component 41 and the case inner cylindrical component 40. On the other hand, the external cable 52 is held between the vehicle body 14 and the case outer cylindrical component 41 in the state that it does not have the load applied due to the steering handle manipulation. In the present embodiment, since the rubber boot 120 is fixedly fitted on the case outer cylindrical component 41 of the cable case 39 at its upper side portion and is fixed to the dashboard 100 of the vehicle body 14 over the entire circumference thereof, the case outer cylindrical component 41 can be firmly secured against rotation compared with the prior art steering device wherein the case outer cylindrical component is fixed at two portions thereof by means of the V-letter shape wire. Moreover, the problem attendant on the V-letter shape wire no longer arises even in the car models wherein the case outer cylindrical component 41 is relatively far from the dashboard 100. That is, according to the present embodiment, it can be realized to secure the case outer cylindrical component 41 of the cable case 39 against rotation relative to the vehicle body 14 irrespective of car models.

In the vehicle in the present embodiment, when the steering handle 17 is pushed strongly upon collision, the column assy 75 is separated from the installment panel reinforcement, and the actuator 18 is pushed down to compressively deform the output side connection shaft 16. Thus, the steering handle 17 together with the actuator 18 is moved to go away from the driver, so that a wide space can be secured ahead of the driver.

Modifications of First Embodiment

The present invention is not limited to the foregoing embodiment. For example, the following modifications are encompassed within the technical scope of the present invention, and besides the following modifications, the present invention can be practiced in various forms without departing from the gist thereof.
(1) Although in the foregoing first embodiment, the rubber boot 120 is fixed to the dashboard 100 through the boot insertion bracket 101, a flange for example may be provided to overhang from the circumferential surface of the rubber boot 120 and may be fixed to the opening edge portion of the through hole 100A formed on the dashboard 100.
(2) Although in the foregoing embodiment, the upper end portion of the rubber boot 120 is fixed with the clamp ring 47 to the case outer cylindrical component 41, adhesive may be used to secure the upper end portion of the rubber boot 120 fitted on the case outer cylindrical component 41.
(3) Although in the foregoing embodiment, the opening edge at the lower end portion of the rubber boot 120 is closely fitted on the output side connection shaft 16 of the actuator 18, an open structure may be taken between the opening edge at the lower end portion of the rubber boot 120 and the output side connection shaft 16.

Second Embodiment

Hereafter, a second embodiment according to the present invention will be described. The substantial parts of the foregoing description regarding the construction of the first embodiment are also applicable to the construction of the second embodiment. However, several parts in FIGS. 2 through 5, 11 and 12 showing the first embodiment are improved in the second embodiment as shown in FIGS. 14 through 17, 20 and 21. Therefore, the foregoing description regarding the construction of the first embodiment is equally applied to the construction of the second embodiment by reading the reference to FIGS. 2 through 5, 11 and 12 as that to FIGS. 14 through 17, 20 and 21 respectively. Hereinafter, with further reference to FIGS. 18 and 19 featuring the second embodiment, in addition to some of FIGS. 14 through 17, 20 and 21, the following description regarding the construction of the second embodiment will be addressed to those respects different from the first embodiment to avoid the repetition of the foregoing description.

Figure 15:
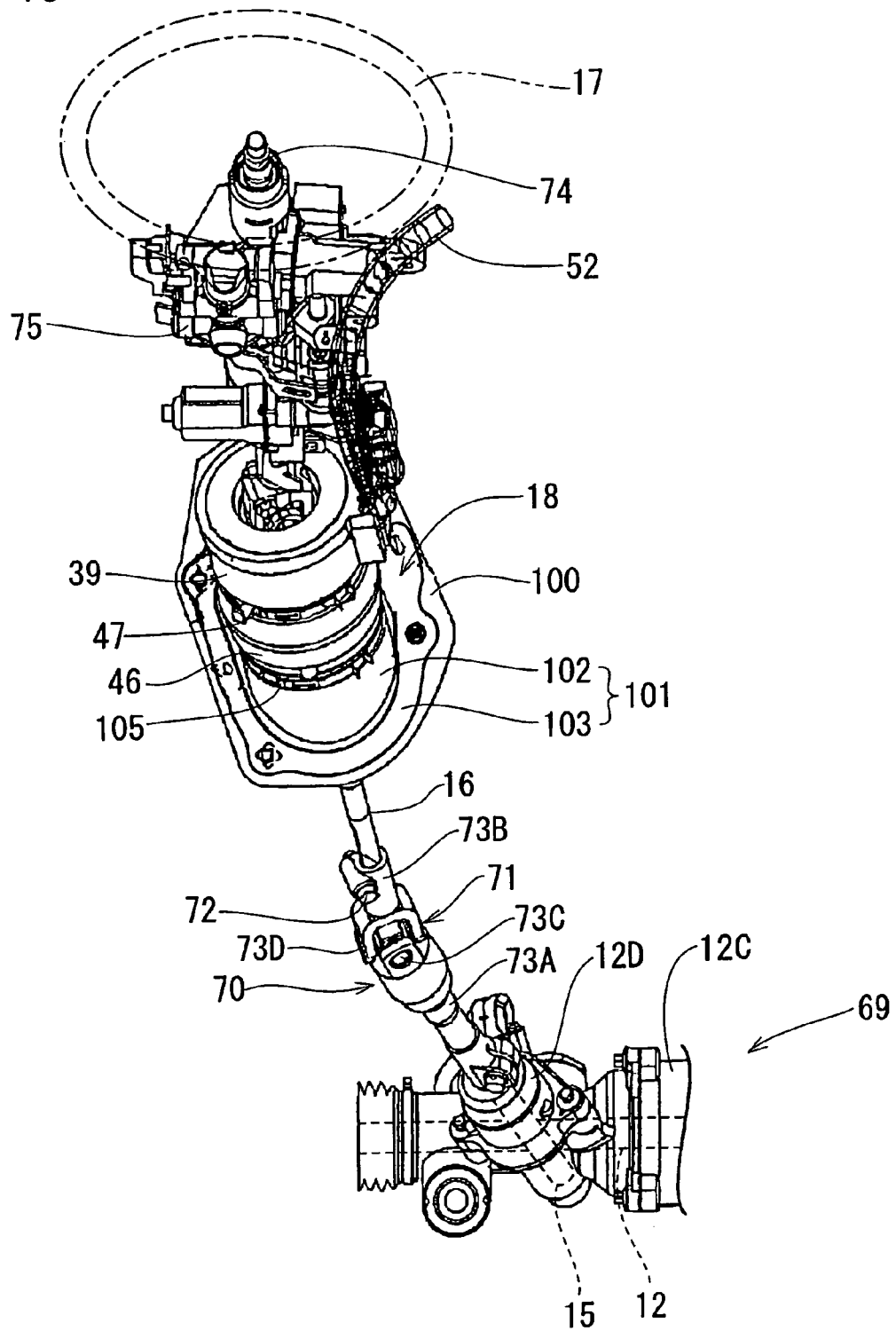
FIG. 15 is a perspective view of the steering device in the second embodiment.
Figure 16:
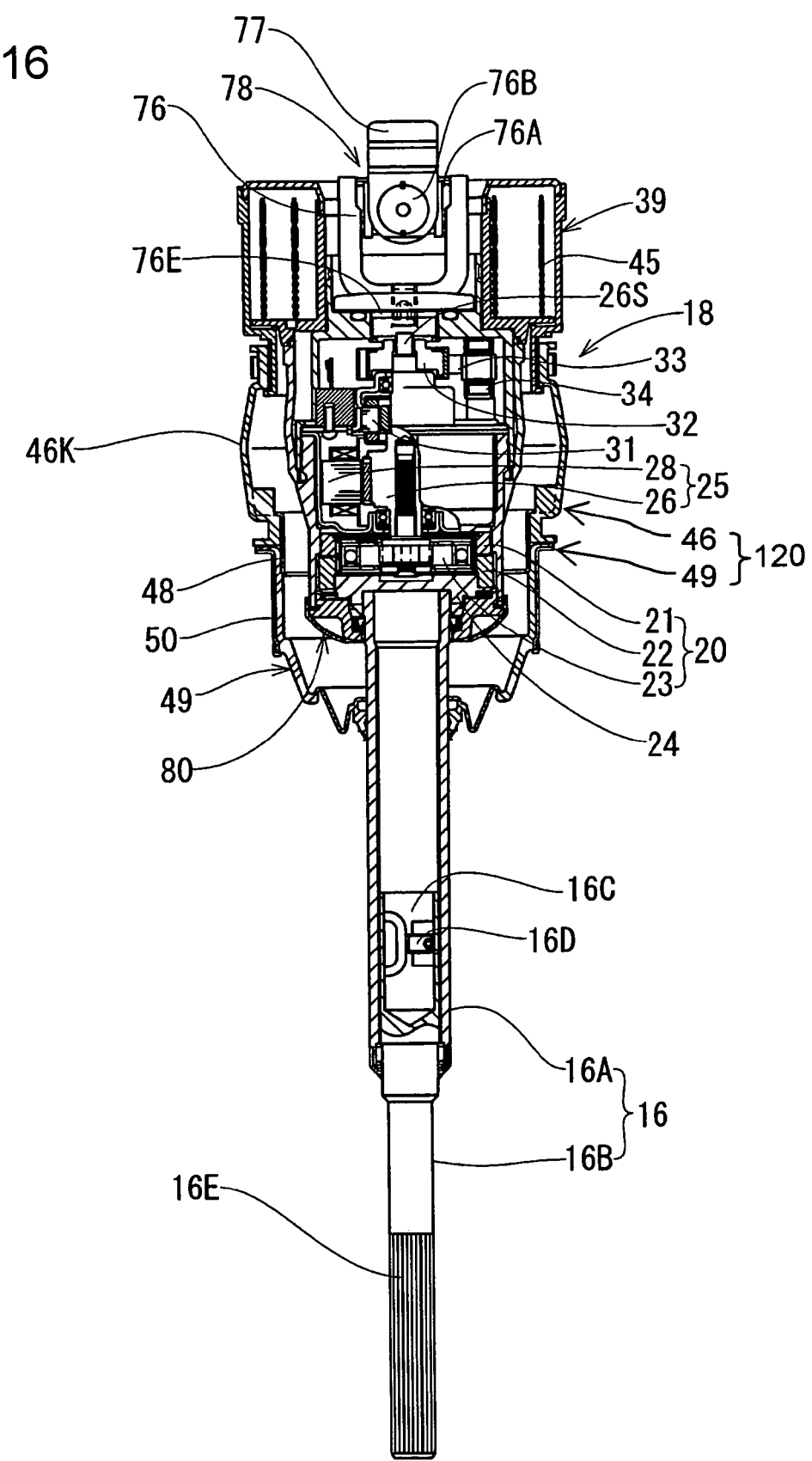
FIG. 16 is a sectional view showing an actuator section of the steering device in the second embodiment.

In the second embodiment, as shown in FIG. 15, the pinion 15 is rotatably carried in a bearing section 12D formed at the intermediate portion of the rack case 12C. The second steering shaft 70 is connected to the upper end portion of the pinion 15 to extend obliquely upward.

Figure 17:
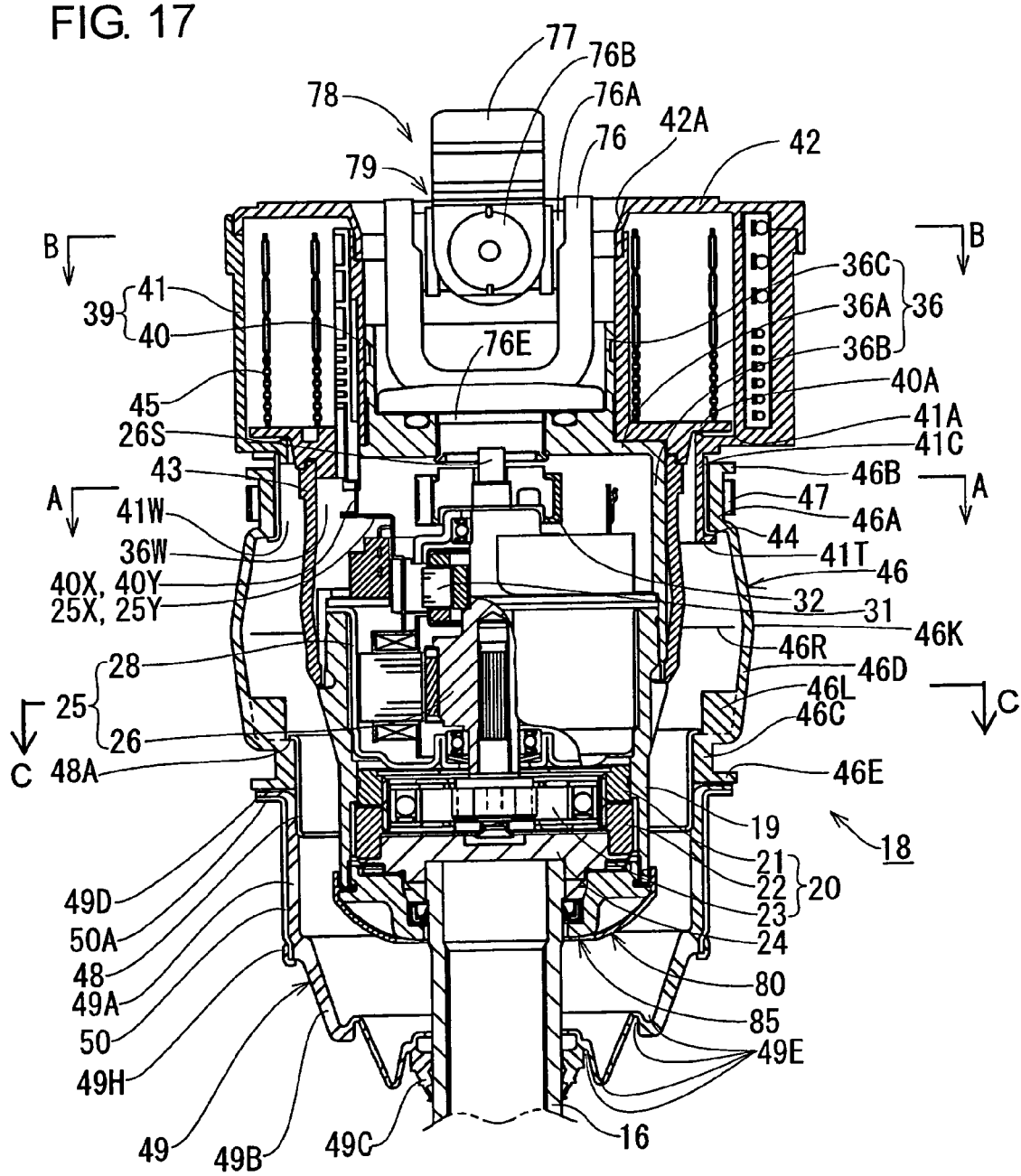
FIG. 17 is an enlarged sectional view of the actuator section shown in FIG. 16.
Figure 19:
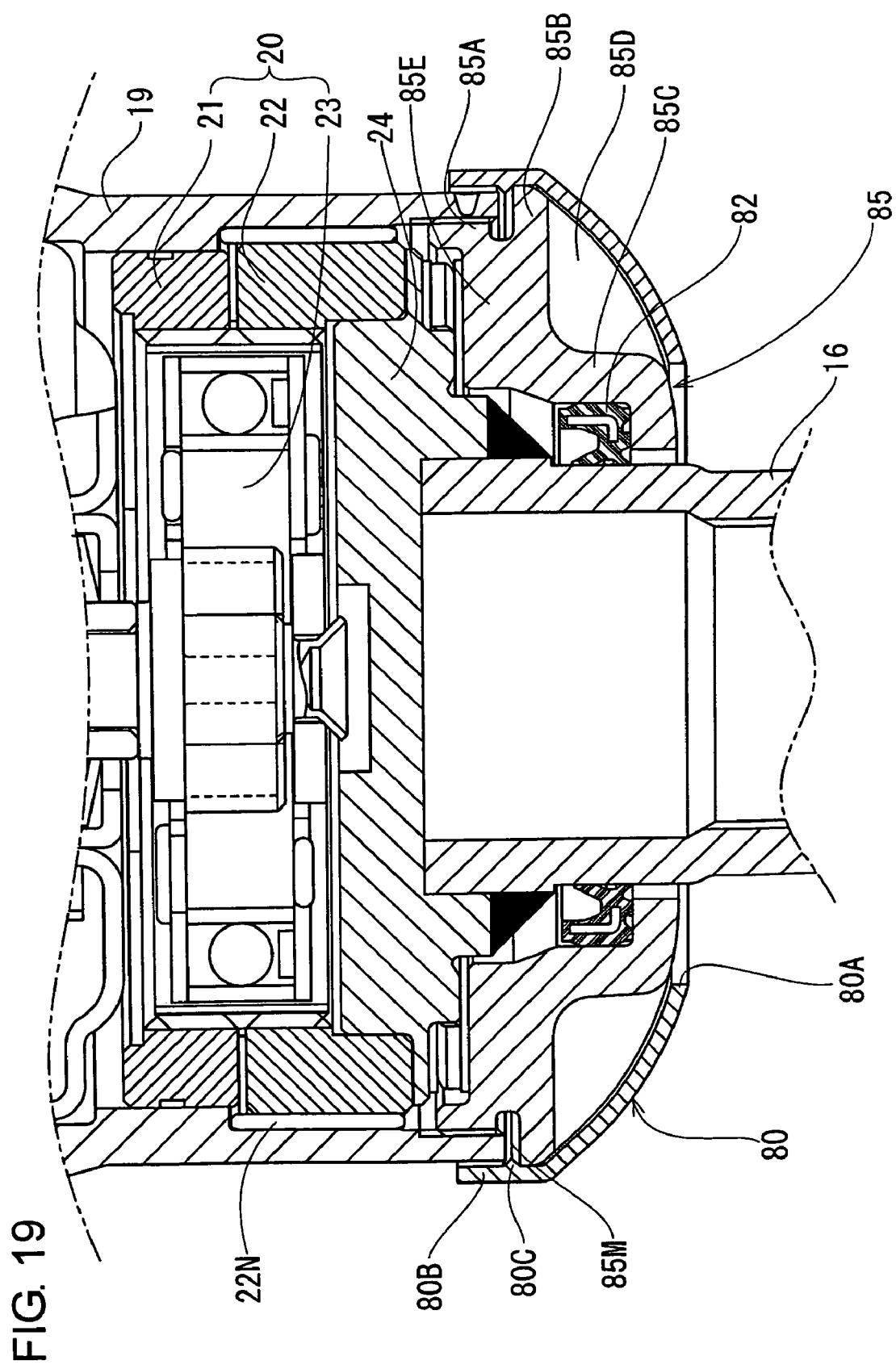
FIG. 19 is a sectional view showing the lower end portion of the actuator section in an exaggerated scale.

Further, as shown in FIG. 19 which in an exaggerated scale, partly shows the lower end portion of the actuator 18 shown in FIG. 17, the reduction gear 20 has plural needles 22N interposed between the outer ring 22 at the lower side and the internal surface of the assy sleeve 19, so that the outer ring 22 is rotatable smoothly within the assy sleeve 19.

Further, also in FIG. 19, the closing cap 85 which is attached to the lower end opening of the assy sleeve 19 takes the shape that a cylindrical portion 85C is protruded downward from the center of an annular disc portion 85E, and the output side connection shaft 16 passes through the interior of the cylindrical portion 85C. As described in the foregoing first embodiment, the oil seal 82 sticking firmly to the output side connection shaft 16 is provided at the internal surface of the cylindrical portion 85C of the closing cap 85. A threaded portion 85A is formed at an upper portion on the outer surface of the annular disc portion 85E, and the closing cap 85 is fixed to the assy sleeve 19 by fitting the threaded portion 85A in the internal surface of the assy sleeve 19 through screw engagement.

A flange portion 85B extends radially outwardly from the lower portion on the outer surface of the annular disc portion 85E. The flange portion 85B is firmly stuck to the lower end surface of the assy sleeve 19 to close the lower end opening of the assy sleeve 19. Chamfers are provided at the outer edge portion of the lower end surface of the assy sleeve 19 as well as at the outer edge portion of the upper end surface of the flange portion 85B, so that an engaging groove 85M in the present invention is formed between the flange portion 85B and the assy sleeve 19.

Figure 18:
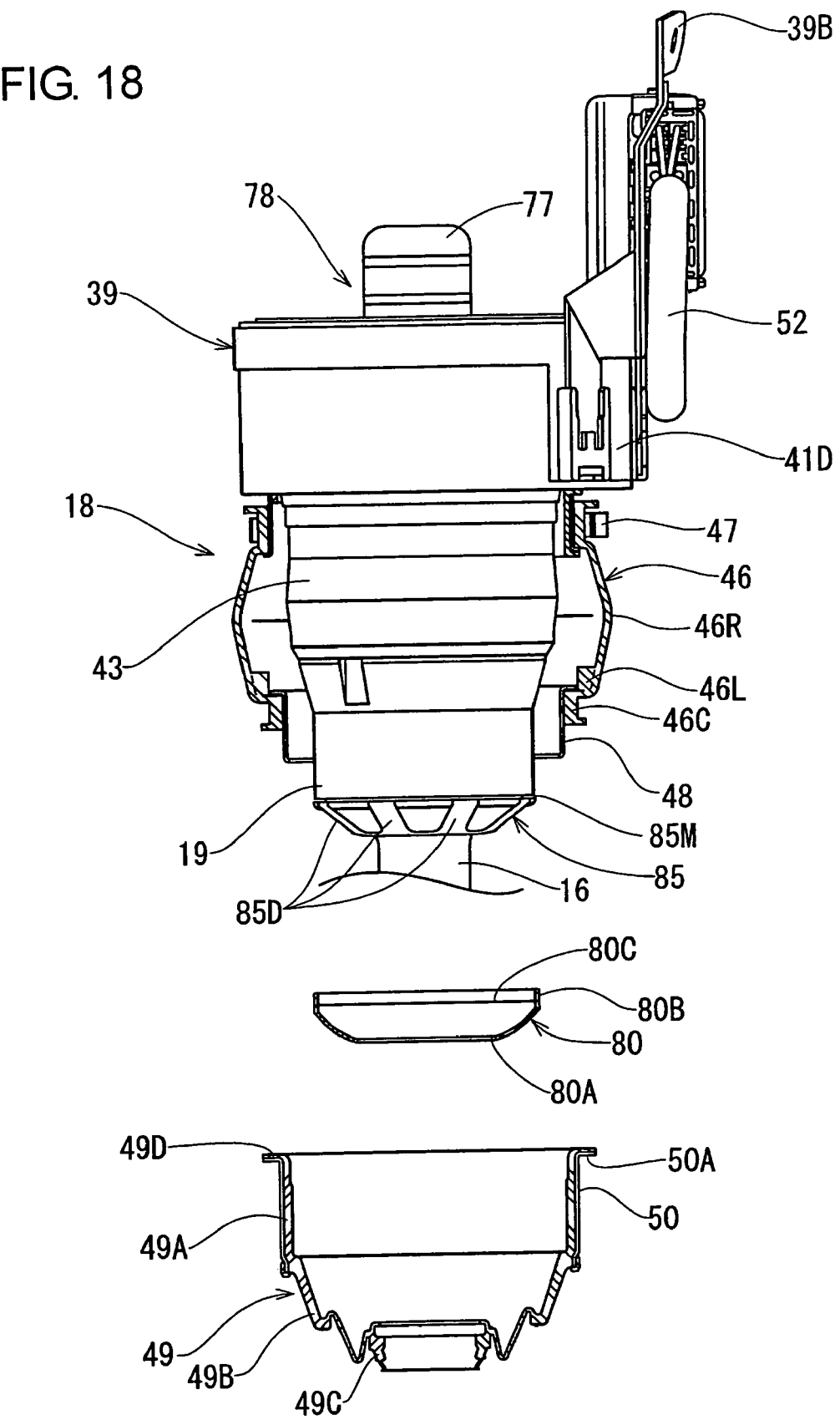
FIG. 18 is a partly sectional view of the actuator section in a partly disassembled state.

Plural support ribs 85D corresponding to a cap support portion in the present invention are formed over the disc portion 85E and the cylindrical portion 85C. The support ribs 85D are arranged at a regular interval in the circumferential direction, as shown in FIG. 18. As shown also in FIG. 19, the outer edge portion of each support rib 85D extends over the outer edge portion of the disc portion 85E and the lower end surface of the cylindrical portion 85C and is roundish. Therefore, the lower surface of the closing cap 85 takes a taper shape as a whole which gradually protrudes downward as it extends from the circumferential edge portion toward the center portion.

As best shown in FIG. 18, the actuator 18 has a cap 80 attached from the lower side of the closing cap 85. The cap 80 is a formed part made of, e.g., synthetic resin (such as PET (polyethylene terephthalate), PP (polypropylene) or the like) and is higher in elasticity than metal parts or components (i.e., the assy sleeve 19 and the closing cap 85) which constitute the lower end corner of the actuator 18.

Also shown in FIG. 19, the cap 80 takes a roundish, taper shape (so-called dome shape) as a whole which gradually protrudes downward as it extends from the circumferential edge portion toward the center portion in correspondence to the lower surface shape of the closing cap 85 and has formed at its center portion a shaft hole 80A through which the output side connection shaft 16 passes. The upper end portion of the cap 80 is provided with a cylindrical portion 80B fitted on the outer surface of the lower end portion of the actuator 18. The cap 80 is fixed to the actuator 18 with an engaging protrusion 80C provided on the internal surface of the cylindrical portion 80B being engaged complementarily with the engaging groove 85M.

Further, as shown in FIG. 18, the wire leading section 41D has a case bracket 39B (also shown in FIG. 14) fixed to its outer surface for fixing the cable case 39 to the vehicle body 14.

Further, through holes of, e.g. plural number are formed at the lower edge portion of an outer cylindrical sleeve 50 (corresponding to the outer metal sleeve 50 in the first embodiment), and protuberances 49H (FIG. 17) which protrude from the lower edge portion of the body section 49A of a second cylindrical boot 49 (corresponding to the second rubber boot 49 in the first embodiment) are engaged with the through holes, whereby the entirety of the body section 49A is fixed to be stuck firmly to the outer cylindrical sleeve 50.

Operation of Second Embodiment

The steering device 10 in the second embodiment as constructed above will be assembled to the vehicle body 14 as follows:

Before assembling the actuator 18, the steering gear unit 69 is fixed to a bottom portion of the vehicle body 14 in advance, and the column assy 75 is fixed to the installment panel reinforcement in advance. Thus, the first and second steering shafts 74, 70 are placed to face each other through the through hole 100A of the dashboard 100. The steering handle 17 is left released from the first steering shaft 74 of the column assy 75.

Figure 20:
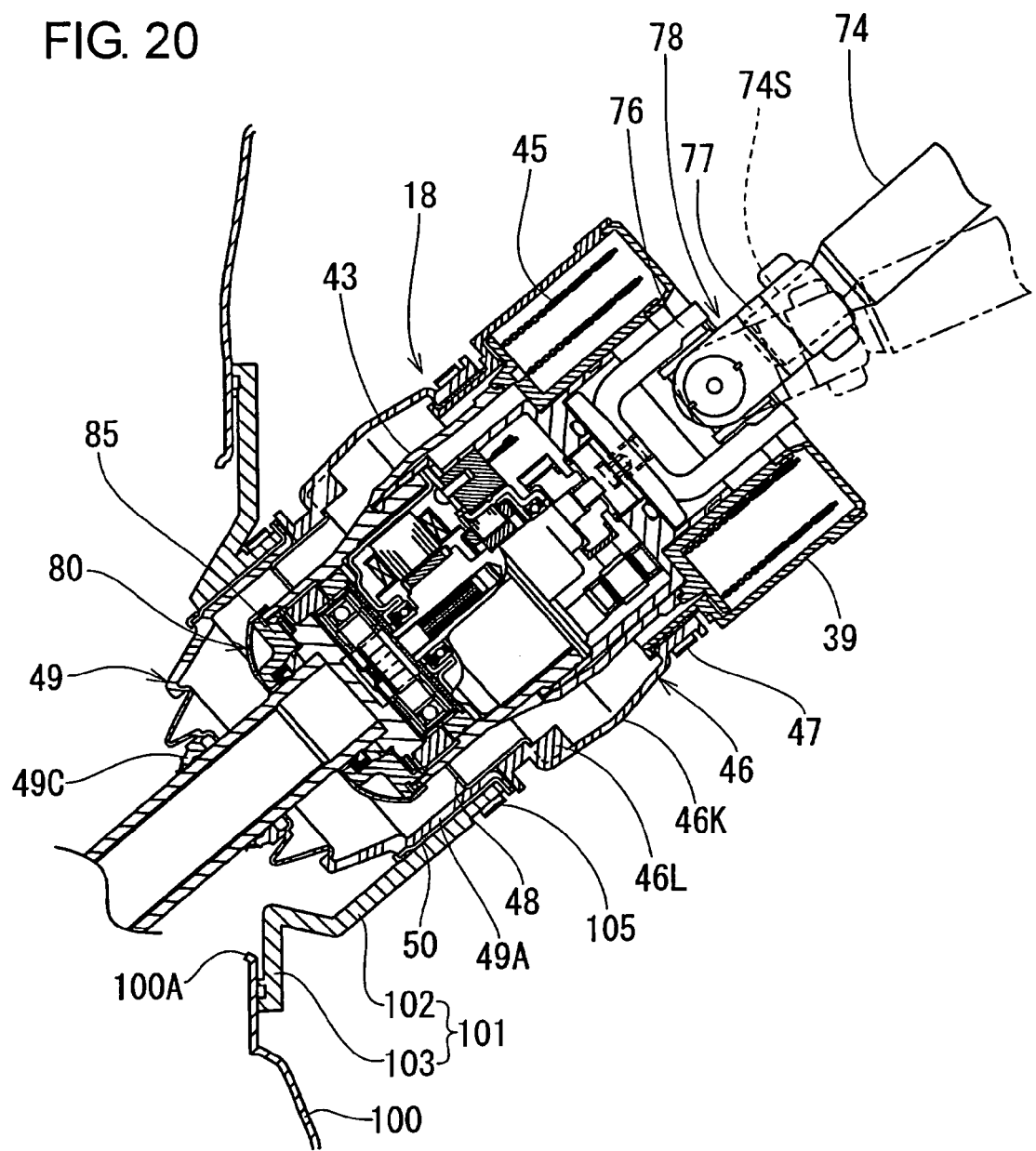
FIG. 20 is a sectional view of the actuator section attached to a dashboard in the second embodiment.

Then, a bracket 101 (corresponding to the boot insertion bracket 101 in the first embodiment) is attached to the actuator 18, and the output side connection shaft 16 protruding from the lower end of the bracket 101 is inserted into the through hole 100A of the dashboard 100 to be brought into spline-connection with the upper end portion of the second steering shafts 70. In this state, the flat plate portion 103 of the bracket 101 is fixed by means of bolts to the opening edge portion of the through hole 100A of the dashboard 100, as shown in FIG. 20.

Figure 21:
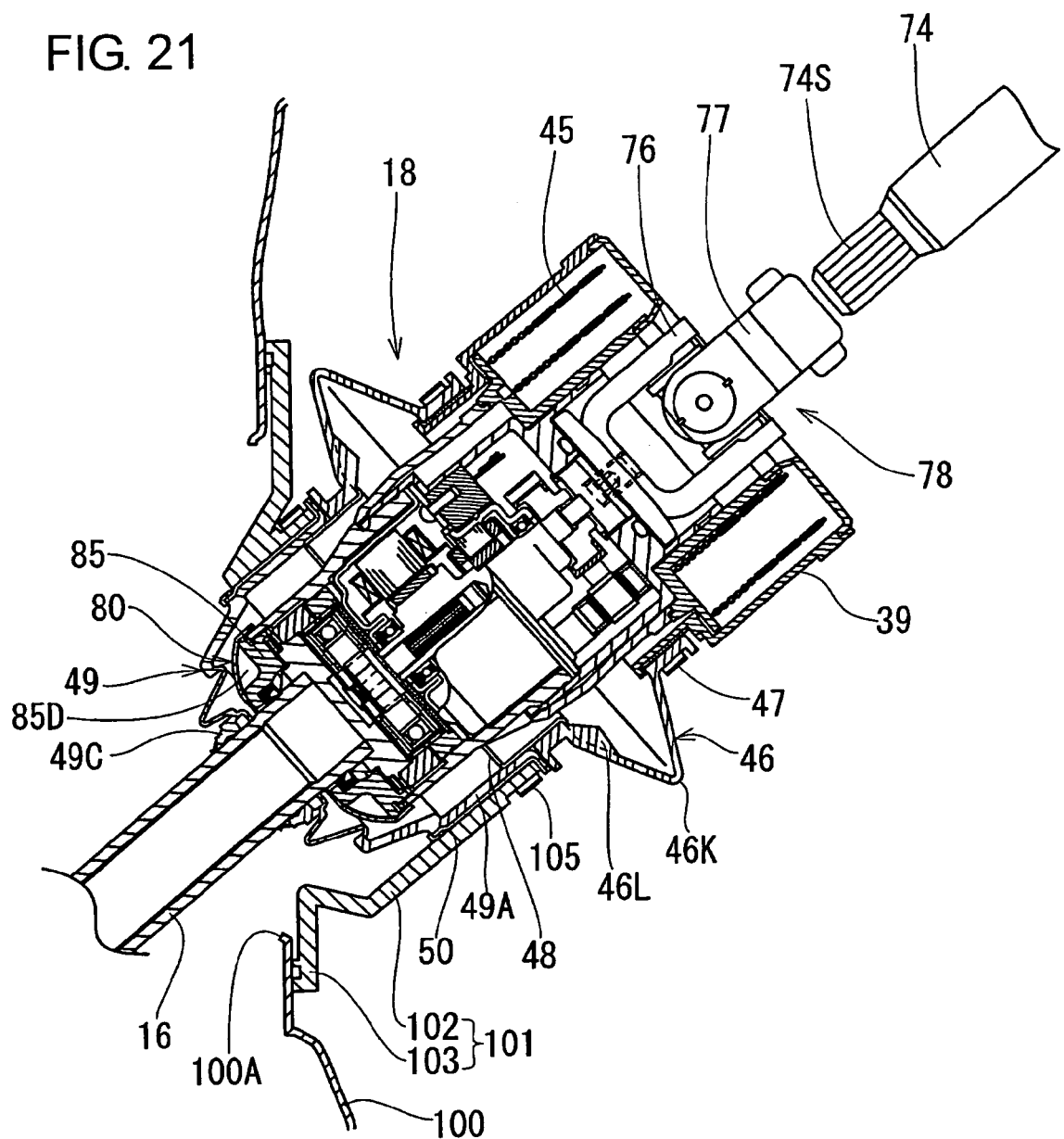
FIG. 21 is a sectional view of the actuator section in the second embodiment attached to the dashboard with a rubber boot being compressively deformed.

Subsequently, the actuator 18 is pushed down as shown in FIG. 21. More specifically, this can be done by gripping the cable case 39 and then by pushing it down. Thus, the bendable portion 46K of a first cylindrical boot 46 (corresponding to the first rubber boot 46 in the first embodiment) is crushed down to be compressively deformed, whereby the actuator 18 is moved downward relative to first and second cylindrical boots 46, 49 (respectively corresponding to the first and second rubber boots 46, 49 in the first embodiment). At this time, since the lower end corner portion of the actuator 18 in the present embodiment is covered with the cap 80 which is higher in elasticity, the damage of the second cylindrical boot 49 can be avoided even when the lower end corner portion of the actuator 18 is brought into hit on the second cylindrical boot 49. Accordingly, it becomes unnecessary to take great care in moving the actuator 18 downward, so that the efficiency in the assembling work in the present embodiment can be improved compared with that in the prior art steering device.

Thereafter, the joint sleeve 77 of the input side connection shaft 78 and the first steering shaft 74 are brought to face with each other with the actuator 18 having been moved down. Then, the actuator 18 is moved upward to insert the lower end portion of the first steering shaft 74 into the joint sleeve 77. Thus, the first steering shaft 74 is spline-connected to the input side connection shaft 78 of the actuator 18. Then, the case bracket 39B attached to the cable case 39 is fixed to the vehicle body 14 by means of bolts (not shown), and the bolt 72 provided on the second steering shaft 70 is screwed up to secure the output side connection shaft 16 against coming out from the second steering shaft 70.

Finally, the external cable 52 led from the actuator 18 is connected to the ECU 60 shown in FIG. 1. Through the foregoing works, the actuator 18 is assembled to the vehicle body 14, whereby the steering device 10 is completed.

In the vehicle incorporating the steering device 10 constructed as described above, the ECU 60 drivingly controls the actuator 18 in dependence on the traveling state to alter the transmission ratio of the rotation transmitted between the first and second steering shafts 74, 70 in the same manner as described in detail in the foregoing first embodiment. That is, the ROM 63 provided in the ECU 60 stores the map (not shown) wherein various transmission ratios have been set respectively in correspondence to various vehicle speeds. Thus, the ECU 60 determines a transmission ratio to be selected based on a detection result of the vehicle speed sensor 62 (refer to FIG. 1) and the map. Then, the ECU 60 calculates a target rotational angle for the output side connection shaft 16 from the steering angle of the steering handle 17 detected by the steering angle sensor 61 and the determined transmission ratio. Consequently, the ECU 60 applies a drive current to the motor 25 through the external cable 52 and the spiral cable 45 to rotate the rotor 26, whereby the actual rotational angle of the output side connection shaft 16 is controlled to coincide with the target rotational angle.

As earlier described for the first embodiment, the map has been set to have a property that the transmission ratio becomes smaller as the vehicle speed increases. Thus, it becomes realized that the front wheels 11, 11 can be steered through a slight manipulation of the steering handle 17 in a low speed range, whereby the capability of turning the vehicle can be heightened. In a high speed range, on the contrary, a so-called sharp handling is restricted, whereby a stable traveling can be realized.

By the way, when the vehicle comes into collision, the airbag 17A expands upon the shock of the collision. At this time, the steering handle 17 is pushed by the drivers arms or by the airbag 17A, whereby the axis force greater than a predetermined value is momentarily applied to the steering handle 17. Thus, the column assy 75 comes out from the installment panel reinforcement to push the actuator 18 downward. This causes the inside cylindrical member 43 and the case inner cylindrical component 40 of the cable case 39 to come out from the coupling housing 36 and the assy sleeve 19. As a result, the body portion of the actuator 18 is moved obliquely downward as it compresses the output side connection shaft 16.

In the present second embodiment, as best shown in FIG. 19, since the cap 80 covering the lower end surface of the actuator 18 takes the taper shape and since the plural support ribs 85D provided on the actuator 18 support the cap 80 from inside, the actuator 18 is moved downward as it pushes the component (e.g., the dashboard 100) at the lower side away at the cap 80 of the taper shape. Even if the cap 80 is broken at this time, the support ribs 85D are able to push the component at the lower side away. Accordingly, when the vehicle comes into collision, the steering handle 17 together with the actuator 18 is moved smoothly in the direction going away from the driver, so that a wide space can be secured ahead of the driver.

As described above, according to the steering device 10 in the present second embodiment, since the lower end corner portion of the actuator 18 is covered with the cap 80 of a high elasticity, the damage of the second cylindrical boot 49 can be obviated even when the lower end corner portion of the actuator 18 is brought into hit on the second cylindrical boot 49 during the assembling work. Further, the cap 80 takes the taper shape and since the support ribs 85D support the cap 80 from inside, the handle 17 together with the actuator 18 is moved smoothly in the direction going away from the driver upon collision of the vehicle, so that a wide space can be secured ahead of the driver.

Modifications of Second Embodiment

The present invention is not limited to the foregoing second embodiment. For example, the following modifications are encompassed within the technical scope of the present invention, and besides the following modifications, the present invention may be practiced in various forms without departing from the gist thereof.

(1) Although the cap 80 in the foregoing second embodiment covers not only the lower end corner portion of the actuator 18 but also an area adjacent to the center portion of the lower end surface, the cap in the present invention may be constructed to cover the lower end corner portion only of the actuator 18.

(2) Although the cap 80 in the foregoing second embodiment takes a roundish dome shape, it may be a conical shape or a pyramid shape.

(3) Although in the foregoing second embodiment, the plural support ribs 85D are formed on the lower end surface of the actuator 18 with intervals therebetween, the entire lower end surface of the actuator 18 may be formed to take a taper shape.

(4) Although in the foregoing second embodiment, the output side connection shaft 16 provided on the actuator 18 is constructed to be compressively deformable for enabling the actuator 18 to be moved downward, the second steering shaft 70 provided on the steering gear unit 69 may instead be constructed to be compressively deformable.

Various features and many of the attendant advantages in the foregoing embodiments will be summarized as follows:

In the steering device 10 in the foregoing first embodiment typically shown in FIGS. 5 and 11, since the rubber boot 120 is fitted and fixed on the case outer cylindrical component 41 at the upper side portion thereof and is fixed to the dashboard 100 of the vehicle body 14 at the lower side portion thereof, the case outer cylindrical component 41 can be secured against rotation more firmly than that in the prior art steering device wherein two portions on a case outer cylindrical component are fixed with a wire of a V-letter shape. Further, the problem attendant on the wire of the V-letter shape in the prior art steering device no longer arises even in the car models wherein the case outer cylindrical component 41 and the dashboard 100 are relatively far from each other. That is, according to the present invention, it can be realized to secure the case outer cylindrical component 41 of the cable case 39 against rotation relative to the vehicle body 14 even in any car model.

Also in the steering device 10 in the foregoing first embodiment typically shown in FIGS. 5 and 11, since the outer metal sleeve 50 fixed on the outer surface of the rubber boot 120 slides on the internal surface of the cylinder portion 102 of the boot insertion bracket 101, the assembling of the rubber boot 120 into the boot insertion bracket 101 can be done smoothly. Further, since the rubber boot 120 is reinforced by the outer metal sleeve 50, it can be realized to firmly fix the rubber boot 120 and the boot insertion bracket 101 together.

Also in the steering device 10 in the foregoing first embodiment typically shown in FIGS. 5 and 12, the rubber boot 120 is easily deformed at the bendable portion 46K in the axial direction when brought into hit on the dashboard 100 or the boot insertion bracket 101 in assembling the actuator 18 at the intermediate portion of the steering shaft 80. Therefore, it can be realized to efficiently perform the assembling work of the actuator 18 to the steering shaft 90.

In the steering device 10 in the foregoing second embodiment typically shown in FIGS. 18, 19 and 21, since the lower end corner portion of the actuator 18 is covered with the cap 80 being higher in elasticity, the damage of the rubber boot 49 can be obviated even when the lower end corner portion of the actuator 18 is brought into hit on the rubber boot 49 during the assembling work.

Also in the steering device 10 in the foregoing second embodiment typically shown in FIGS. 18, 19 and 21, since the cap 80 covering the lower end surface of the actuator 18 takes the taper shape, the actuator 18 is able to move downward to push the component at the lower side away at the cap 80 of the taper shape when pushed downward together with the steering handle 17 upon collision of the vehicle. Therefore, the steering handle 17 together with the actuator 18 is moved smoothly in the direction going away from the driver upon collision of the vehicle, so that a wide space can be secured ahead of the driver.

Also in the steering device 10 in the foregoing second embodiment typically shown in FIGS. 18, 19 and 21, the cap 80 is reinforced by the cap support portion (ribs 85D) when pushing the component at the lower side away upon collision of the vehicle. Since the cap support portion takes the taper shape, the cap support portion is able to push the component at the lower side away even if the cap 80 is broken.

Also in the steering device 10 in the foregoing second embodiment typically shown in FIGS. 18 and 19, the engaging protrusion 80C and the engaging groove 85M are engaged complimentarily by fitting the cap 80 on the actuator 18, so that the cap 80 can be fixed to the actuator 18.

Obviously, numerous further modifications and variations of the present invention are possible in light of the above teachings. It is therefore to be understood that within the scope of the appended claims, the present invention may be practiced otherwise than as specifically described herein.

What is claimed is:

1. A steering device comprising:
    an actuator provided at an intermediate portion of a steering shaft extending downward from a steering handle to pass through a dashboard of a vehicle body for altering the transmission ratio in rotation between upper and lower portions of the steering shaft in dependence on a traveling state;
    a cable case of a double cylindrical structure arranged on an upper surface of the actuator;
    a case inner cylindrical component constituting the inside of the cable case and fixed to the actuator;
    a case outer cylinder component constituting the outside of the cable case and rotatable relative to the case inner cylindrical component;
    a spiral cable provided for supplying the actuator with electric power and housed inside the cable case with itself being wound, the spiral cable being fixed to the case inner cylindrical component at one end thereof and to the case outer cylindrical component at the other end thereof; and
    a cylindrical rubber boot covering the circumferential surface of the actuator;
    wherein:
    an upper side portion of the rubber boot is fitted on the case outer cylindrical component to be fixed thereto;
    a mid-portion of the rubber boot is fixed to the dashboard; and
    a lower end of the rubber boot seals against the lower portion of the steering shaft.

2. The steering device as set forth in claim 1, wherein:
    boot insertion bracket is further provided having a cylindrical portion in which the rubber boot is fitted and fixed, and a flat plate portion overhanging laterally from the cylindrical portion to be fixed to the dashboard; and
    metal sleeve is fixed to a portion which is inserted into the boot insertion bracket of the outer surface of the rubber boot.

3. The steering device as set forth in claim 1, wherein a bendable portion whose ridge line extends in the circumferential direction of the rubber boot is formed between a portion fixed to the case outer cylindrical component and another portion fixed to the dashboard, of the rubber boot.

4. The steering device as set forth in claim 2, wherein a bendable portion whose ridge line extends in the circumferential direction of the rubber boot is formed between a portion fixed to the case outer cylindrical component and another portion fixed to the dashboard, of the rubber boot.

5. The steering device as set forth in claim 1, wherein the steering shaft is composed of a first steering shaft extending downward from the steering handle, and an second steering shaft extending upward from a steering gear unit provided between a pair of steerable wheels;

the actuator is connected between the first and second steering shafts for transmitting rotation therebetween and being capable of altering the transmission ratio of the rotation in dependence on a traveling state;

an input side connection shaft is provided at an upper end portion of the actuator and connected to the first steering shaft through fitting engagement to be rotatable bodily therewith;

an output side connection shaft is protruding for a lower end surface of the actuator connected to the second steering shaft through fitting engagement to be rotatable bodily therewith;

the rubber boot covers the circumferential surface and the lower end surface of the actuator and allowing the output side connection shaft to pass through a portion thereof covering the lower end surface;

a bracket is adapted for fixing an axial intermediate portion of the rubber boot to the dashboard of the vehicle body;

with the rubber boot fixed to the dashboard through the bracket and with the first steering shaft carried rotationally by the vehicle body, the input side connection shaft and the first steering shaft are brought into face-to-face relation by moving the actuator downward s the rubber boot is deformed compressively and are connected to each other through fitting engagement then by moving the actuator upward, and the steering device further comprises a cap made of a member which is higher in elasticity than another member composing a lower end corner portion of the actuator, for covering the lower and corner portion of the actuator.

6. The steering device as set forth in claim 5, wherein the cap covers the actuator from the lower end corner portion to an area adjacent to the center portion of the lower end surface and takes a taper shape which downwardly expands gradually as it extends from its circumferential edge portion toward its center portion; and the actuator is constructed to be moved downward upon receiving from the side of the steering handle an impact which is greater in magnitude than a predetermined value.

7. The steering device as set forth in claim 6, wherein a cap support portion of a taper shape which downwardly expands gradually as it extends its circumferential edge portion toward its center portion is provided on the lower end surface of the actuator for supporting the cap from inside.

8. The steering device as set forth in claim 5, wherein the cap is fitted at its one end on the outer side of the lower end of the actuator; and an engaging protrusion and an engaging groove which complementarily engage with each other are provided at fitting portions of the cap and the actuator.

9. The steering device as set forth in claim 6, wherein the cap is fitted at its one end on the outer side of the lower end of the actuator; and an engaging protrusion and an engaging groove which complementarily engage with each other are provided at fitting portions of the cap and the actuator.

10. The steering device as set forth in claim 7, wherein the cap is fitted at its one end on the outer side of the lower end of the actuator; and an engaging protrusion and a engaging groove which complementarily engage with each other are provide at fitting portions of the cap and the actuator.

* * * * *